US010623738B2

(12) United States Patent
Liu et al.

(10) Patent No.: US 10,623,738 B2
(45) Date of Patent: Apr. 14, 2020

(54) NOISE SUPPRESSION FILTER

(71) Applicant: Futurewei Technologies, Inc., Plano, TX (US)

(72) Inventors: Shan Liu, Santa Clara, CA (US); Roman Chernyak, Moscow (RU); Jiali Fu, Shenzhen (CN); Victor Stepin, Moscow (RU); Xiang Ma, Shenzhen (CN); Igor Pasechnik, Moscow (RU); Sergey Ikonin, Moscow (RU)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/937,256

(22) Filed: Mar. 27, 2018

(65) Prior Publication Data

US 2018/0295364 A1 Oct. 11, 2018
US 2019/0020870 A9 Jan. 17, 2019

Related U.S. Application Data

(60) Provisional application No. 62/482,619, filed on Apr. 6, 2017, provisional application No. 62/529,972, filed
(Continued)

(51) Int. Cl.
*H04N 19/117* (2014.01)
*H04N 19/86* (2014.01)
(Continued)

(52) U.S. Cl.
CPC ......... *H04N 19/117* (2014.11); *H04N 19/174* (2014.11); *H04N 19/176* (2014.11);
(Continued)

(58) Field of Classification Search
CPC ......... H04N 19/42; H04N 19/44; H04N 19/80
(Continued)

(56) References Cited

U.S. PATENT DOCUMENTS 8,526,495 B2 9/2013 Liu et al.
9,049,452 B2 6/2015 Liu et al.
(Continued)

FOREIGN PATENT DOCUMENTS

CN 102972022 A 3/2013
CN 104205829 A 12/2014
(Continued)

OTHER PUBLICATIONS

Foreign Communication From a Counterpart Application, Taiwanese Application No. 10820321110, Taiwanese Office Action dated Apr. 9, 2019, 21 pages.
(Continued)

*Primary Examiner* — Dominic D Saltarelli
(74) *Attorney, Agent, or Firm* — Conley Rose, P.C.

(57) ABSTRACT

A mechanism of video coding is provided. The mechanism includes generating a reconstructed image from an encoded video stream. The reconstructed image is filtered to create a filtered image. The filtering includes applying a noise suppression filter to the reconstructed image. The noise suppression filter may be applied immediately prior to applying a deblocking filter to the reconstructed image, between a deblocking filter and a sample adaptive offset (SAO) filter, between the SAO filter and an adaptive loop filter, or after the adaptive loop filter. The filtered image is then stored in a picture buffer in memory for use in encoding or for output to a display in decoding.

17 Claims, 13 Drawing Sheets

Related U.S. Application Data on Jul. 7, 2017, provisional application No. 62/560,555, filed on Sep. 19, 2017.

(51) Int. Cl.

| | |
|---|---|
| *H04N 19/82* | (2014.01) |
| *H04N 19/46* | (2014.01) |
| *H04N 19/176* | (2014.01) |
| *H04N 19/174* | (2014.01) |
| *H04N 19/186* | (2014.01) |
| *H04N 19/70* | (2014.01) |
| *H04N 19/96* | (2014.01) |

(52) U.S. Cl.
CPC ........... *H04N 19/186* (2014.11); *H04N 19/46* (2014.11); *H04N 19/70* (2014.11); *H04N 19/82* (2014.11); *H04N 19/86* (2014.11); *H04N 19/96* (2014.11)

(58) Field of Classification Search
USPC ..................................... 375/240.25, 240.29
See application file for complete search history.

(56) References Cited

U.S. PATENT DOCUMENTS

| | | | |
|---|---|---|---|
| 9,363,511 | B2 | 6/2016 | Zhang et al. |
| 9,510,012 | B2 | 11/2016 | Liu et al. |
| 9,769,472 | B2 | 9/2017 | Liu et al. |
| 9,788,019 | B2 | 10/2017 | Liu et al. |
| 9,813,726 | B2 | 11/2017 | Liu et al. |
| 2004/0125113 | A1* | 7/2004 | Kempf ................... H04N 5/208 345/611 |
| 2008/0137753 | A1 | 6/2008 | He |
| 2011/0222597 | A1 | 9/2011 | Xu et al. |
| 2011/0243249 | A1 | 10/2011 | Lee et al. |
| 2012/0044992 | A1 | 2/2012 | Chong et al. |
| 2013/0028327 | A1 | 1/2013 | Narroschke et al. |
| 2013/0258049 | A1 | 10/2013 | Chong et al. |
| 2014/0086323 | A1 | 3/2014 | Chuang et al. |
| 2014/0286396 | A1 | 9/2014 | Lee et al. |
| 2015/0172719 | A1 | 6/2015 | Guo et al. |
| 2015/0365692 | A1 | 12/2015 | Liu et al. |
| 2016/0142706 | A1 | 5/2016 | Chuang et al. |
| 2017/0034536 | A1 | 2/2017 | Filippov et al. |
| 2017/0272745 | A1 | 9/2017 | Liu et al. |
| 2017/0353719 | A1 | 12/2017 | Liu et al. |
| 2017/0374369 | A1 | 12/2017 | Chuang et al. |
| 2018/0249159 | A1 | 8/2018 | Narroschke et al. |
| 2019/0045224 | A1* | 2/2019 | Huang ................. H04N 19/176 |

FOREIGN PATENT DOCUMENTS

| | | |
|---|---|---|
| CN | 104902284 A | 9/2015 |
| CN | 106028050 A | 10/2016 |
| CN | 106134201 A | 11/2016 |
| WO | 2012155553 A1 | 11/2012 |

OTHER PUBLICATIONS

Foreign Communication From a Counterpart Application, Taiwanese Application No. 10820321110, Taiwanese Search Report dated Apr. 7, 2019, 1 page.
"Series H: Audiovisual and Multimedia Systems, Infrastructure of audiovisual services—Coding of moving video, High efficiency video coding," ITU-T, H.265, Dec. 2016, 664 pages.
Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual Communications and Image Processing, Jan. 20-25, 2002, 10 pages.
Liu, S., et al., "Complexity Reduction of Joint Temporal-Spatial Bit Allocation Using R-D Models for Video Streaming," IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and Memory Efficient GOP Structures Supporting VCR Functionalities in H. 264/AVC," IEEE International Symposium on Circuits and Systems, 2008, pp. 636-639.
Lou, J., et al., "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size NxN," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2NxN and Nx2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-G1042, Nov. 21-30, 2011, 4 pages.
Cao, X., et al., "AHG16 Unification of SDIP and NSQT," JCTVC-H0347, Feb. 1-10, 2012, 9 pages.
Zhang, X., et al., "Non-CE6: Intra mode coding with fixed length binarization," JCTVC-H0435, WG11 No. m23311, Feb. 1-10, 2012, 5 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222_r1, Apr. 18-26, 2013, 9 pages.
Lai, P., et al., "Non-SCE3.4: Simplified Generalized Combined Prediction," JCTVC-M0222, Apr. 2013, 10 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra BC merge mode with default candidates," JCTVC-S0123, Oct. 17-24, 2014, 7 pages.
Xu, X., et al., "CE2 Test 3.2: Intra BC merge mode with default candidates," JCTVC-T0073, Feb. 10-18, 2015, 6 pages.

(56) References Cited

OTHER PUBLICATIONS

PCT/RU2016/000917 entitled "Mixed Domain Collaborative Post Filter for Lossy Still Image Coding," WO/2018/117893, Dec. 23, 2016, 37 pages.
PCT/RU2016/000919 entitled "Mixed Domain Collaborative In-loop filter for Lossy Video Coding," WO/2018/1117895 Dec. 23, 2016, 40 pages.
PCT/RU2016/000920 entitled "Low Complexity Mixed Domain Collaborative In-Loop Filter for Lossy Video Coding," WO/2018/117896, Dec. 23, 2016, 34 pages.
An, J., et al., "Block partitioning structure for next generation video coding," ITU-T SG16 Doc. COM16-C966-E, Sep. 2015, 7 pages.
Bjontegaard, G., "Calculation of average PSNR differences between RD-curves (VCEG-M33)," VCEG-M33, Apr. 2001, 4 pages.
Foreign Communication From a Counterpart Application, PCT Application No. PCT/CN2018/080981, English Translation of International Search Report dated Jun. 6, 2018, 5 pages.
Foreign Communication From a Counterpart Application, PCT Application No. PCT/CN2018/080981, English Translation of Written Opinion dated Jun. 6, 2018, 4 pages.
Chen, J., et al., "Algorithm Description of Joint Exploration Test Model 4," Joint Video Exploration Team (JVET) of ITU-T SG.16 and ISO/IEC JTC1/SC29/WG11; Document: JVET-D1001_v1, Oct. 15-21, 2016, XP030150460, 38 pages.
Foreign Communication From a Counterpart Application, European Application No. 18781803.4, Partial Supplementary European Search Report dated Dec. 9, 2019, 15 pages.
Bross, B., " High efficiency video coding (HEVC) text specialization draft 7," Joint Collaborative Team on Video Coding (JCT-VC) of ITU-T SG16 WP3 and ISO/IEC JTC1/SC29/WG11, JCTVC-I1003_d0, May 10, 2012, 268 pages.
Dabov, K., et al., "Image Denosing by Sparse 3-D Transform-Domain Collaborative Filtering," IEEE Transactions on Image Processing, vol. 16, No. 8, Aug. 2007, pp. 2080-2095.
Maggioni, M., et al. "Video Denoising, Deblocking, and Enhancement Through Seperable 4-D nonlocal Spatiotemporal Transforms," IEEE Transactions on Image Processing, vol. 21, No. 9, Sep. 2012, pp. 3952-3966.
Foreign Communication From A Counterpart Application, Chinese Application No. 2018808008175.3, Chinese Search Report dated Dec. 31, 2019, 4 pages.
Foreign Communication From a Counterpart Application, Chinese Application No. 201880008175.3, Chinese Office Action dated Jan. 9, 2020, 9 pages.
Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.

\* cited by examiner

NOISE SUPPRESSION FILTER

CROSS-REFERENCE TO RELATED APPLICATIONS

This patent application claims the benefit of U.S. Provisional Patent Application No. 62/482,619, filed Apr. 6, 2017, by Shan Liu, et al., and titled "Noise Suppression Filter," and U.S. Provisional Patent Application No. 62/529,972, filed Jul. 7, 2017, by Roman Chernyak, et al., and titled "In-loop Filtering for Video Compression," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method, implemented in a computing device, the method comprising generating, by a processor of the computing device, a reconstructed image from an encoded video stream, filtering, by the processor, the reconstructed image to create a filtered image, the filtering including applying a noise suppression filter to the reconstructed image immediately prior to applying a deblocking filter to the reconstructed image, and storing the filtered image in a picture buffer in memory.

Optionally, in any of the preceding aspects, another implementation of the aspect includes the encoded video stream is encoded in a bitstream including a noise suppression filter flag that indicates the noise suppression filter is applied to a sequence of encoded video stream images containing the reconstructed image. Optionally, in any of the preceding aspects, another implementation of the aspect includes the encoded video stream is encoded in a bitstream including a noise suppression filter flag that indicates the noise suppression filter is applied to the reconstructed image. Optionally, in any of the preceding aspects, another implementation of the aspect includes the encoded video stream is encoded in a bitstream including a noise suppression filter flag that indicates the noise suppression filter is applied to a slice of the reconstructed image. Optionally, in any of the preceding aspects, another implementation of the aspect includes the encoded video stream is encoded in a bitstream including a noise suppression filter flag that indicates the noise suppression filter is applied to a coding tree unit of the reconstructed image. Optionally, in any of the preceding aspects, another implementation of the aspect includes the encoded video stream is encoded in a bitstream including one or more noise suppression filter flags that indicate the noise suppression filter is applied to luma components of the reconstructed image or chroma components of the reconstructed image. Optionally, in any of the preceding aspects, another implementation of the aspect includes the encoded video stream is encoded in a bitstream including a noise suppression filter flag that indicates the noise suppression filter is applied to a current block of the reconstructed image based on syntax elements corresponding to a neighboring block of the reconstructed image. Optionally, in any of the preceding aspects, another implementation of the aspect includes the encoded video stream is encoded in a bitstream including a maximal depth flag that indicates a maximum depth of coding units in a coding tree to which the noise suppression filter is applied for a sub-portion of the reconstructed image. Optionally, in any of the preceding aspects, another implementation of the aspect includes the encoded video stream is encoded in a bitstream including a size constraint that indicates a minimum size of coding units in a coding tree to which the noise suppression filter is applied for a sub-portion of the reconstructed image. Optionally, in any of the preceding aspects, another implementation of the aspect includes the noise suppression filter is applied to one or more blocks of the reconstructed image based on an application map of the reconstructed image.

In an embodiment, the disclosure includes a method, implemented in a computing device, the method comprising generating, by a processor of the computing device, a reconstructed image from an encoded video stream, filtering, by the processor, the reconstructed image to create a filtered image, the filtering including applying a noise suppression filter to the reconstructed image immediately after applying a deblocking filter to the reconstructed image and immediately prior to applying a sample adaptive offset filter to the reconstructed image, and storing the filtered image in a picture buffer in memory.

Optionally, in any of the preceding aspects, another implementation of the aspect includes the encoded video stream is encoded in a bitstream including a noise suppression filter flag that indicates the noise suppression filter is applied to a sequence of encoded video stream images containing the reconstructed image. Optionally, in any of the preceding aspects, another implementation of the aspect includes the encoded video stream is encoded in a bitstream including a noise suppression filter flag that indicates the noise suppression filter is applied to the reconstructed image. Optionally, in any of the preceding aspects, another implementation of the aspect includes the encoded video stream is encoded in a bitstream including a noise suppression filter flag that indicates the noise suppression filter is applied to a slice of the reconstructed image. Optionally, in any of the preceding aspects, another implementation of the aspect includes the encoded video stream is encoded in a bitstream including a noise suppression filter flag that indicates the noise suppression filter is applied to a coding tree unit of the reconstructed image. Optionally, in any of the preceding aspects, another implementation of the aspect includes the encoded video stream is encoded in a bitstream including one or more noise suppression filter flags that indicate the noise suppression filter is applied to luma components of the reconstructed image or chroma components of the reconstructed image. Optionally, in any of the preceding aspects, another implementation of the aspect includes the encoded video stream is encoded in a bitstream including a noise suppression filter flag that indicates the noise suppression filter is applied to a current block of the reconstructed image based on syntax elements corresponding to a neighboring block of the reconstructed image. Optionally, in any of the preceding aspects, another implementation of the aspect includes the encoded video stream is encoded in a bitstream including a maximal depth flag that indicates a maximum depth of coding units in a coding tree to which the noise suppression filter is applied for a sub-portion of the reconstructed image. Optionally, in any of the preceding aspects, another implementation of the aspect includes the encoded video stream is encoded in a bitstream including a size constraint that indicates a minimum size of coding units in a coding tree to which the noise suppression filter is applied for a sub-portion of the reconstructed image. Optionally, in any of the preceding aspects, another implementation of the aspect includes the noise suppression filter is applied to one or more blocks of the reconstructed image based on an application map of the reconstructed image.

In an embodiment, the disclosure includes a method, implemented in a computing device, the method comprising generating, by a processor of the computing device, a reconstructed image from an encoded video stream, filtering, by the processor, the reconstructed image to create a filtered image, the filtering including applying a noise suppression filter to the reconstructed image immediately after applying a sample adaptive offset filter to the reconstructed image and immediately prior to applying an adaptive loop filter to the reconstructed image, and storing the filtered image in a picture buffer in memory.

Optionally, in any of the preceding aspects, another implementation of the aspect includes the encoded video stream is encoded in a bitstream including a noise suppression filter flag that indicates the noise suppression filter is applied to a sequence of encoded video stream images containing the reconstructed image. Optionally, in any of the preceding aspects, another implementation of the aspect includes the encoded video stream is encoded in a bitstream including a noise suppression filter flag that indicates the noise suppression filter is applied to the reconstructed image. Optionally, in any of the preceding aspects, another implementation of the aspect includes the encoded video stream is encoded in a bitstream including a noise suppression filter flag that indicates the noise suppression filter is applied to a slice of the reconstructed image. Optionally, in any of the preceding aspects, another implementation of the aspect includes the encoded video stream is encoded in a bitstream including a noise suppression filter flag that indicates the noise suppression filter is applied to a coding tree unit of the reconstructed image. Optionally, in any of the preceding aspects, another implementation of the aspect includes the encoded video stream is encoded in a bitstream including one or more noise suppression filter flags that indicate the noise suppression filter is applied to luma components of the reconstructed image or chroma components of the reconstructed image. Optionally, in any of the preceding aspects, another implementation of the aspect includes the encoded video stream is encoded in a bitstream including a noise suppression filter flag that indicates the noise suppression filter is applied to a current block of the reconstructed image based on syntax elements corresponding to a neighboring block of the reconstructed image. Optionally, in any of the preceding aspects, another implementation of the aspect includes the encoded video stream is encoded in a bitstream including a maximal depth flag that indicates a maximum depth of coding units in a coding tree to which the noise suppression filter is applied for a sub-portion of the reconstructed image. Optionally, in any of the preceding aspects, another implementation of the aspect includes the encoded video stream is encoded in a bitstream including a size constraint that indicates a minimum size of coding units in a coding tree to which the noise suppression filter is applied for a sub-portion of the reconstructed image. Optionally, in any of the preceding aspects, another implementation of the aspect includes the noise suppression filter is applied to one or more blocks of the reconstructed image based on an application map of the reconstructed image.

In an embodiment, the disclosure includes a method, implemented in a computing device, the method comprising generating, by a processor of the computing device, a reconstructed image from an encoded video stream, filtering, by the processor, the reconstructed image to create a filtered image, the filtering including applying a noise suppression filter to the reconstructed image immediately after applying an adaptive loop filter to the reconstructed image, and storing the filtered image in a picture buffer in memory.

Optionally, in any of the preceding aspects, another implementation of the aspect includes the encoded video stream is encoded in a bitstream including a noise suppression filter flag that indicates the noise suppression filter is applied to a sequence of encoded video stream images containing the reconstructed image. Optionally, in any of the preceding aspects, another implementation of the aspect includes the encoded video stream is encoded in a bitstream including a noise suppression filter flag that indicates the noise suppression filter is applied to the reconstructed image. Optionally, in any of the preceding aspects, another implementation of the aspect includes the encoded video stream is encoded in a bitstream including a noise suppression filter flag that indicates the noise suppression filter is applied to a slice of the reconstructed image. Optionally, in any of the preceding aspects, another implementation of the aspect includes the encoded video stream is encoded in a bitstream including a noise suppression filter flag that indicates the noise suppression filter is applied to a coding tree unit of the reconstructed image. Optionally, in any of the preceding aspects, another implementation of the aspect includes the encoded video stream is encoded in a bitstream including one or more noise suppression filter flags that indicate the noise suppression filter is applied to luma components of the reconstructed image or chroma components of the reconstructed image. Optionally, in any of the preceding aspects, another implementation of the aspect includes the encoded video stream is encoded in a bitstream including a noise suppression filter flag that indicates the noise suppression filter is applied to a current block of the reconstructed image based on syntax elements corresponding to a neighboring block of the reconstructed image. Optionally, in any of the preceding aspects, another implementation of the aspect includes the encoded video stream is encoded in a bitstream including a maximal depth flag that indicates a maximum depth of coding units in a coding tree to which the noise suppression filter is applied for a sub-portion of the reconstructed image. Optionally, in any of the preceding aspects, another implementation of the aspect includes the encoded video stream is encoded in a bitstream including a size constraint that indicates a minimum size of coding units in a coding tree to which the noise suppression filter is applied for a sub-portion of the reconstructed image. Optionally, in any of the preceding aspects, another implementation of the aspect includes the noise suppression filter is applied to one or more blocks of the reconstructed image based on an application map of the reconstructed image.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
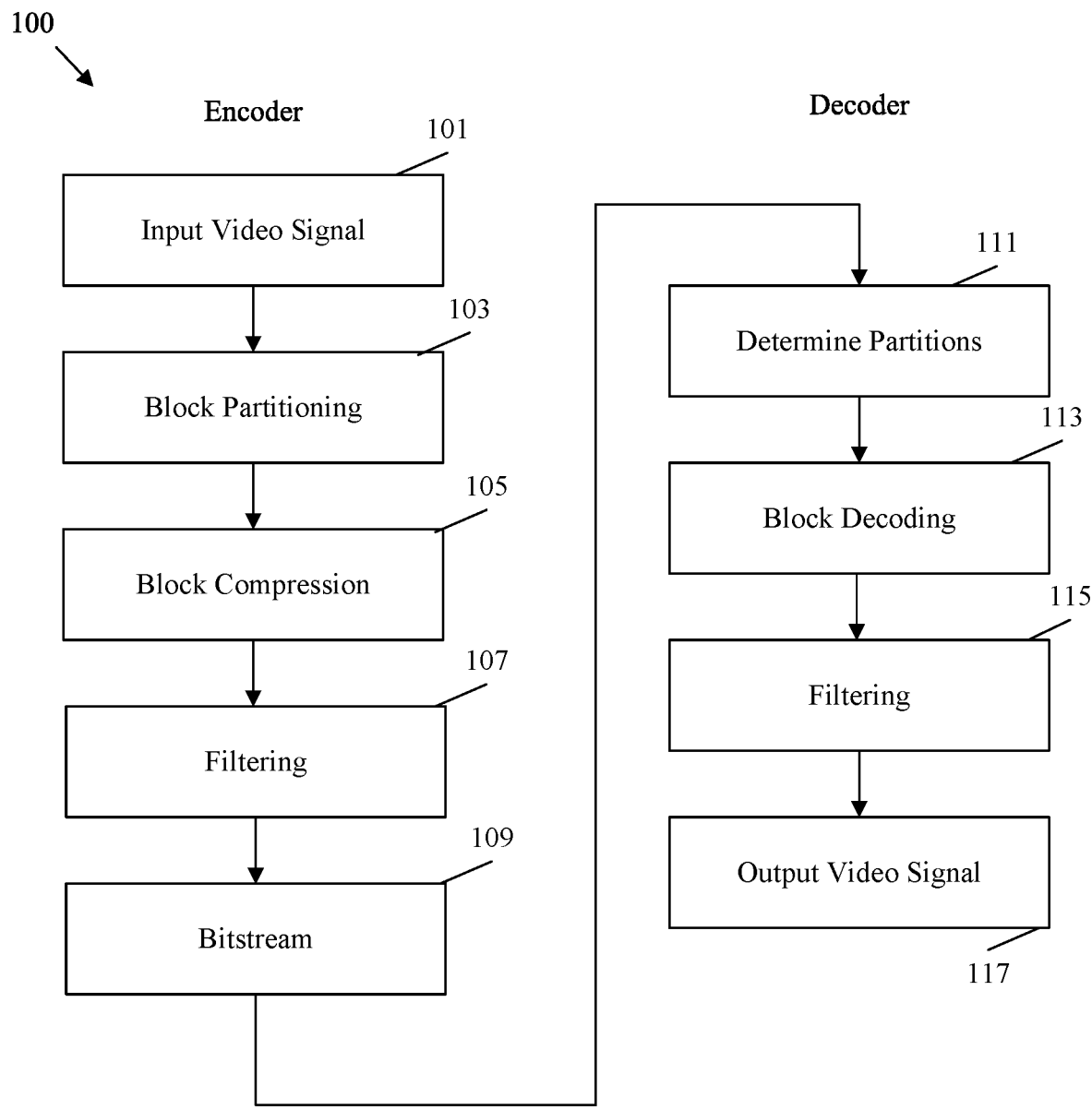
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding schemes subdivide video signals into image frames, and then subdivide the image frames into various types of blocks. The image blocks are then compressed. This approach may create visual artefacts when the compressed video signal is reconstructed and displayed. For example, blocky shapes can be artificially added by the image compression process. This is known as blocking, and generally occurs at block partition boundaries. Also, non-linear signal dependent rounding error, known as quantization noise, may also be artificially added to a compressed image. Various filters may be employed to correct for such artefacts. The filters may be applied to reconstructed frames in post processing. Post processing occurs after significant portions of the compressed video signal have been reconstructed and immediately prior to display to a user. The filters may also be applied as part of the compression/decompression process by employing a mechanism called in-loop filtering. In-loop filtering is a filtering scheme that applies filters to reconstructed video images during the encoding and/or decoding process to support more accurate compression between related images. For example, inter-prediction encodes an image frame based on a previous and/or subsequent image frame. At an encoder, a compressed image is reconstructed and filtered via in-loop filtering so that the reconstructed image provides a more accurate image for use in encoding previous/subsequent image frame(s) via inter-prediction. At a decoder, a compressed image is reconstructed and filtered via in-loop filtering both to create a more accurate image for viewing by an end user and to support more accurate inter-prediction. In-loop filtering employs several filters such as a deblocking filter, a sample adaptive offset (SAO) filter, and an adaptive loop filter. In-loop filtering can also include a noise suppression filter. A noise suppression filter is configured to mitigate quantization noise and may, in some configurations, mitigate sensor noise associated with a video capture device. Applying the noise suppression filter may improve prediction and corresponding compression accuracy. However, in some cases the noise suppression filter may also increase coding complexity and increase resulting file size (e.g., decrease effectiveness of compression). Hence, the utility of the noise suppression filter varies for different cases. As such, global application of the noise suppression filter may not be desirable.

Disclosed herein are various mechanisms to control the application of a noise suppression filter to a video signal. The noise suppression filter may be applied as a first filter before application of a deblocking filter. The noise suppression filter may also be applied as a second filter after application of the deblocking filter and before application of an SAO filter. The noise suppression filter may also be applied as a third filter after application of the SAO filter and before application of an adaptive loop filter. The noise suppression filter may also be applied as a fourth filter after application of the adaptive loop filter. The location of the noise suppressor filter may vary depending on the presence or order of the in-loop filters in the filter chain. For example, one or more of the deblocking filter, the SAO filter, and the adaptive filter may be omitted in some cases, shifts the location of the noise suppression filter accordingly. Also disclosed are various flags to signal use of the noise suppression filter. The flags may indicate the noise suppression filter should be applied at an image sequence level, at an image level, at an image slice level, at a coding tree level, and/or at a block level. The flags may also indicate that the noise suppression filter should be applied to luma components, chroma components, or both. The flags may also indicate a coding tree depth, block size limit, or other thresholds for application of the noise suppression filter. The flags may also indicate the noise suppression filter is applied based on an application map generated to support filtering. The flags may also indicate that parameters associated with the noise suppression filter for a current block should be determined based on parameters for noise suppression filter application in an adjacent block. These and other mechanisms to control application of a noise suppression filter to various sub-portions of a reconstructed image are discussed below.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be referred to as coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and SAO filters to the blocks/frames. These filters mitigate such blocking artefacts so that the encoded file can be accurately reconstructed. Further, these filters mitigate artefacts in the reconstructed reference blocks so that artefacts are less likely to create additional artefacts in subsequent blocks that are encoded based on the reconstructed reference blocks. The in-loop filtering process is discussed in greater detail below.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process. Accordingly, steps 101, 103, 105, 107, and 109 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are only as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking artefacts. Once the frames are filtered, the video signal can be output to a display at step 117 for viewing by an end user.

Figure 2:
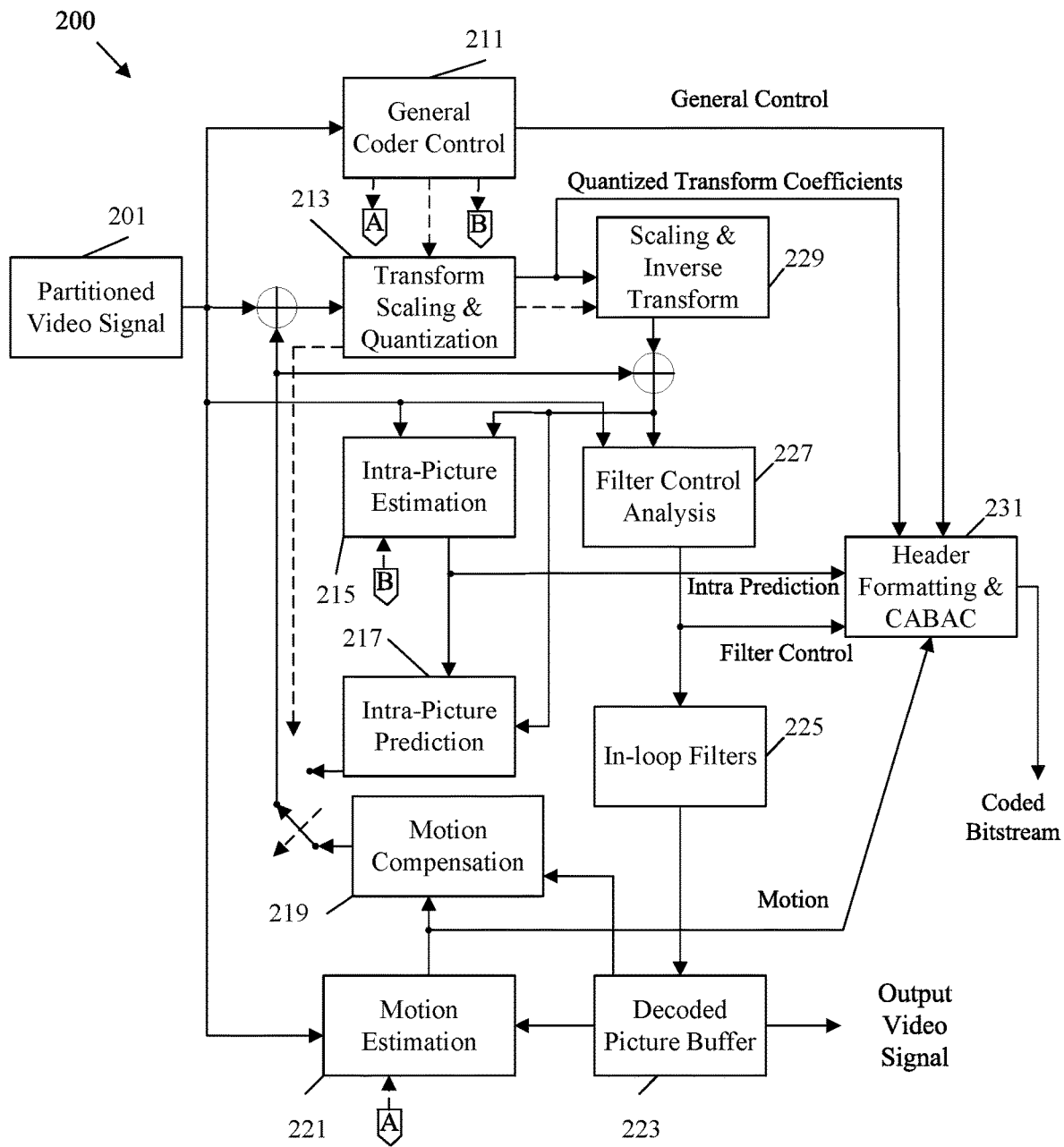
FIG. 2 is a schematic diagram of an example coding and decoding (codec) system for video coding.

FIG. 2 is a schematic diagram of an example coding and decoding (codec) system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filter component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filter component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality. Such decisions may be made based on storage space/bandwidth availability and image resolution requests. The general coder control component 211 also manages buffer utilization in light of transmission speed to mitigate buffer underrun and overrun issues. To manages these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points a reference picture list. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO).

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artefacts created during scaling, quantization, and transform. Such artefacts could otherwise cause inaccurate prediction (and create additional artefacts) when subsequent blocks are predicted.

The filter control analysis component 227 and the in-loop filters component 225 apply the filters to the residual blocks and/or to reconstructed image blocks. For example, the transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as codeword mapping tables), definitions of encoding contexts for various blocks, indications of a most probable intra-prediction modes, an indication of partition information, etc. Such data may be encoded be employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

Figure 3:
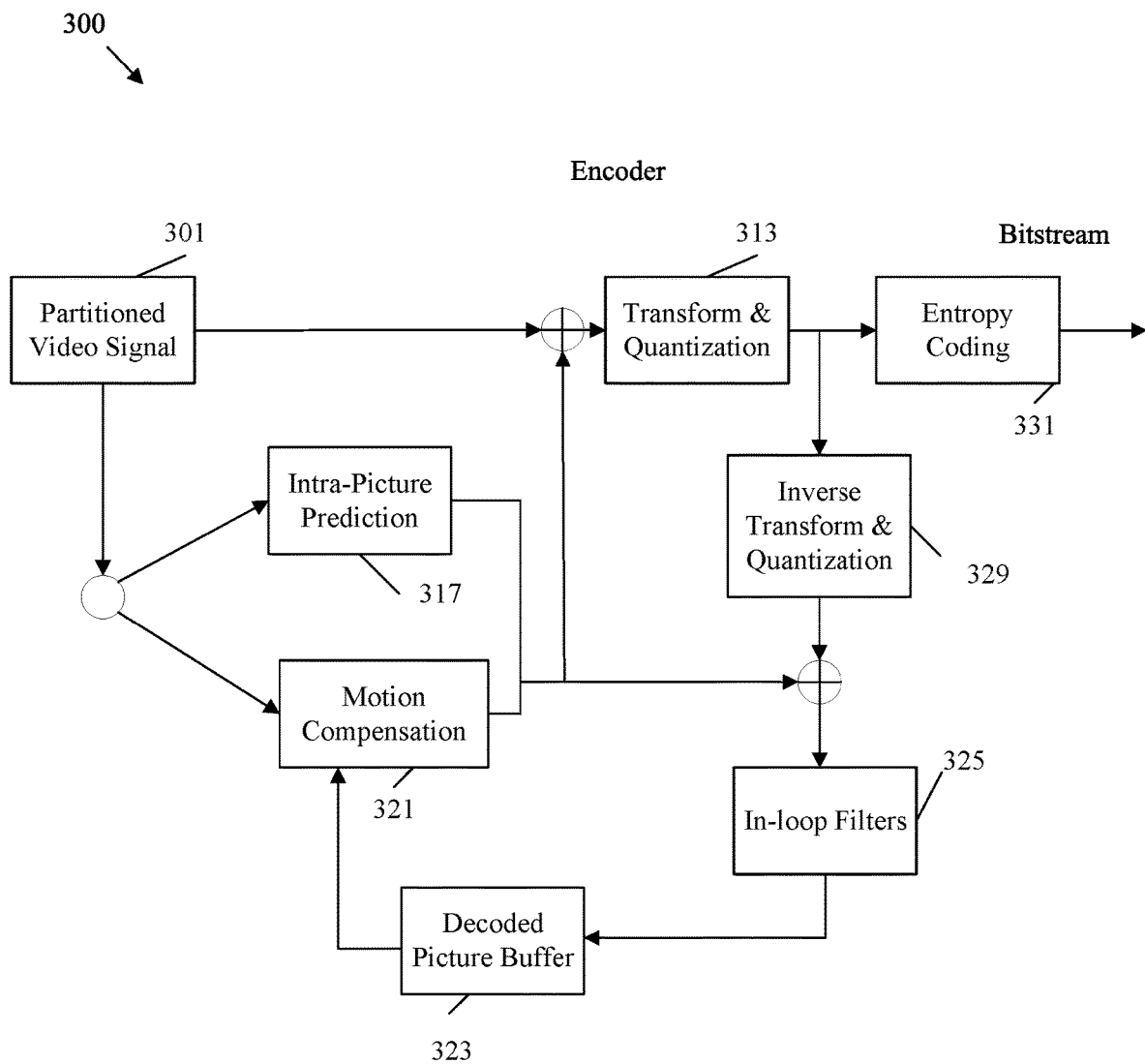
FIG. 3 is a block diagram illustrating an example video encoder that may implement a noise suppression filter.

FIG. 3 is a block diagram illustrating an example video encoder 300 that may implement a noise suppression filter. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forward from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks and/or reconstructed reference blocks, depending on the example. The in-loop filters component 325 may be substantially similar to the filter control analysis component 227 and the in-loop filters component 225. The in-loop filters component 325 may include multiple filters, including a noise suppression filter as discussed below. The filtered blocks are then stored in a decoded picture buffer 323 for use a reference blocks by the motion compensation component 321. The decoded picture buffer 323 may be substantially similar to the decoded picture buffer 223.

As discussed in more detail below, the order of filters applied by the in-loop filters component 325 can affect the accuracy of motion estimation by the motion compensation component 321 and/or intra-picture prediction component 317 and hence can affect the video quality of the reconstructed video signal at the decoder and/or the compression of the encoded bitstream. As discussed herein, the in-loop filters component 325 may adaptively apply a noise suppression filter. The noise suppression filer can be applied prior to applying a deblocking filter to the reconstructed image, between a deblocking filter and a SAO filter, between the SAO filter and an adaptive loop filter, or after the adaptive loop filter. Further, the noise suppression filter can be applied at various partitioning levels of the partitioned video signal 301, which in turn affects both compression and video quality. In some examples, the deblocking filter, the SAO filter, and/or adaptive loop filter may be omitted. Further, additional filters may also be employed. Accordingly, the noise suppression filter can be positioned as the first, second, third, fourth, last, etc. filter in the in-loop filters component 325.

Figure 4:
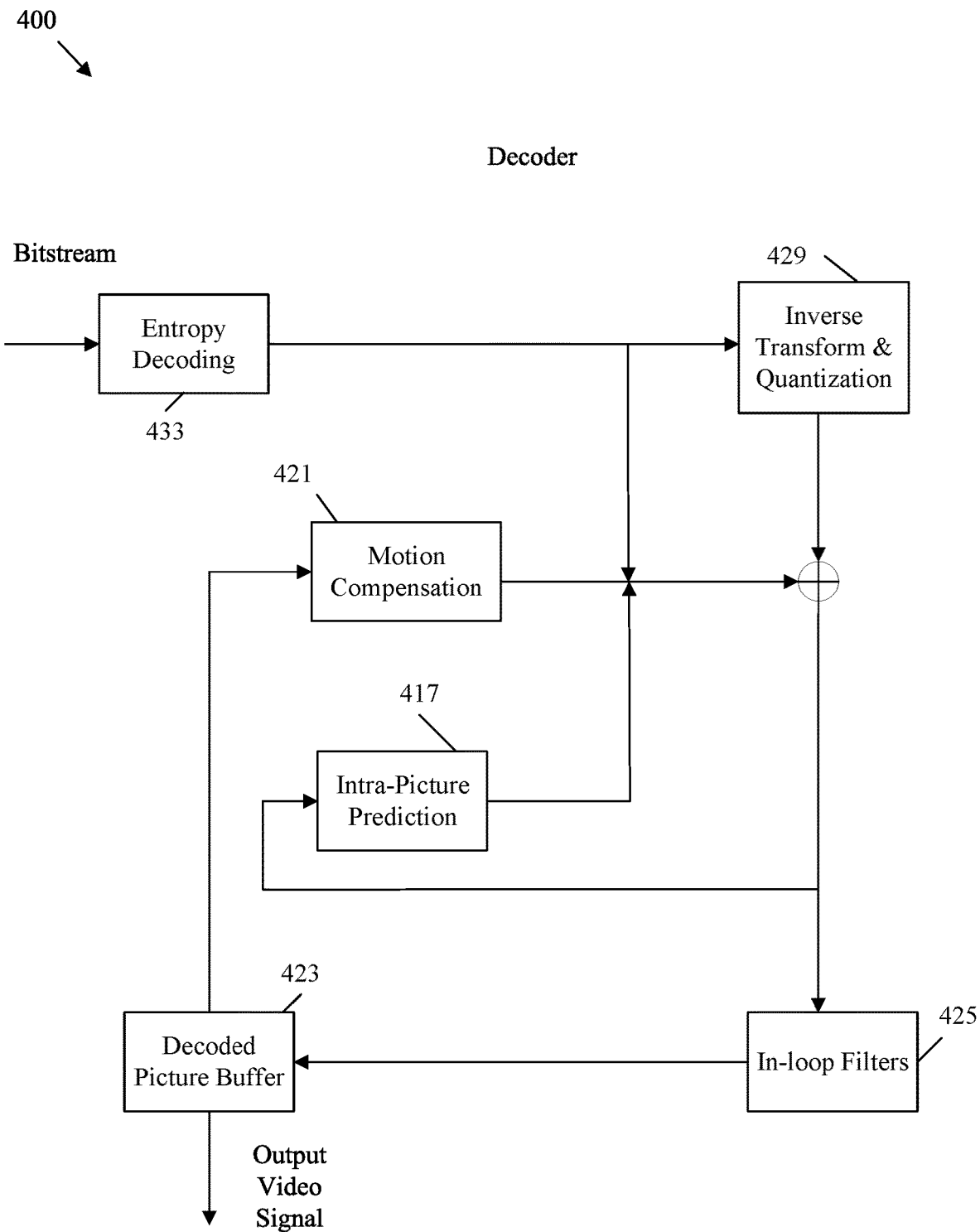
FIG. 4 is a block diagram illustrating an example video decoder that may implement a noise suppression filter.

FIG. 4 is a block diagram illustrating an example video decoder 400 that may implement a noise suppression filter. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 performs the reverse function of the entropy encoding component 331. The entropy decoding component 433 is configured to implement an entropy decoding scheme, such as CAVLC, CABAC, SBAC, PIPE coding or other entropy coding technique. For example, the entropy decoding component 433 may employ header information to provide a context to interpret additional data encoded as codewords in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operate in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filter the reconstructed image blocks, residual blocks and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

As with in-loop filters component 325, the order of filters applied by the in-loop filters component 425 can affect the accuracy of motion estimation by the motion compensation component 421 and/or intra-picture prediction component 417 and hence can affect the video quality of the reconstructed output video signal at the decoder. As discussed herein, the in-loop filters component 425 may adaptively apply a noise suppression filter. The noise suppression filer can be applied prior to applying a deblocking filter to the reconstructed image, between a deblocking filter and a SAO filter, between the SAO filter and an adaptive loop filter, or after the adaptive loop filter. Further, the noise suppression filter can be applied at various partitioning levels of the reconstructed output video signal, which in turn affects the video quality of the reconstructed output video signal.

Figure 5:
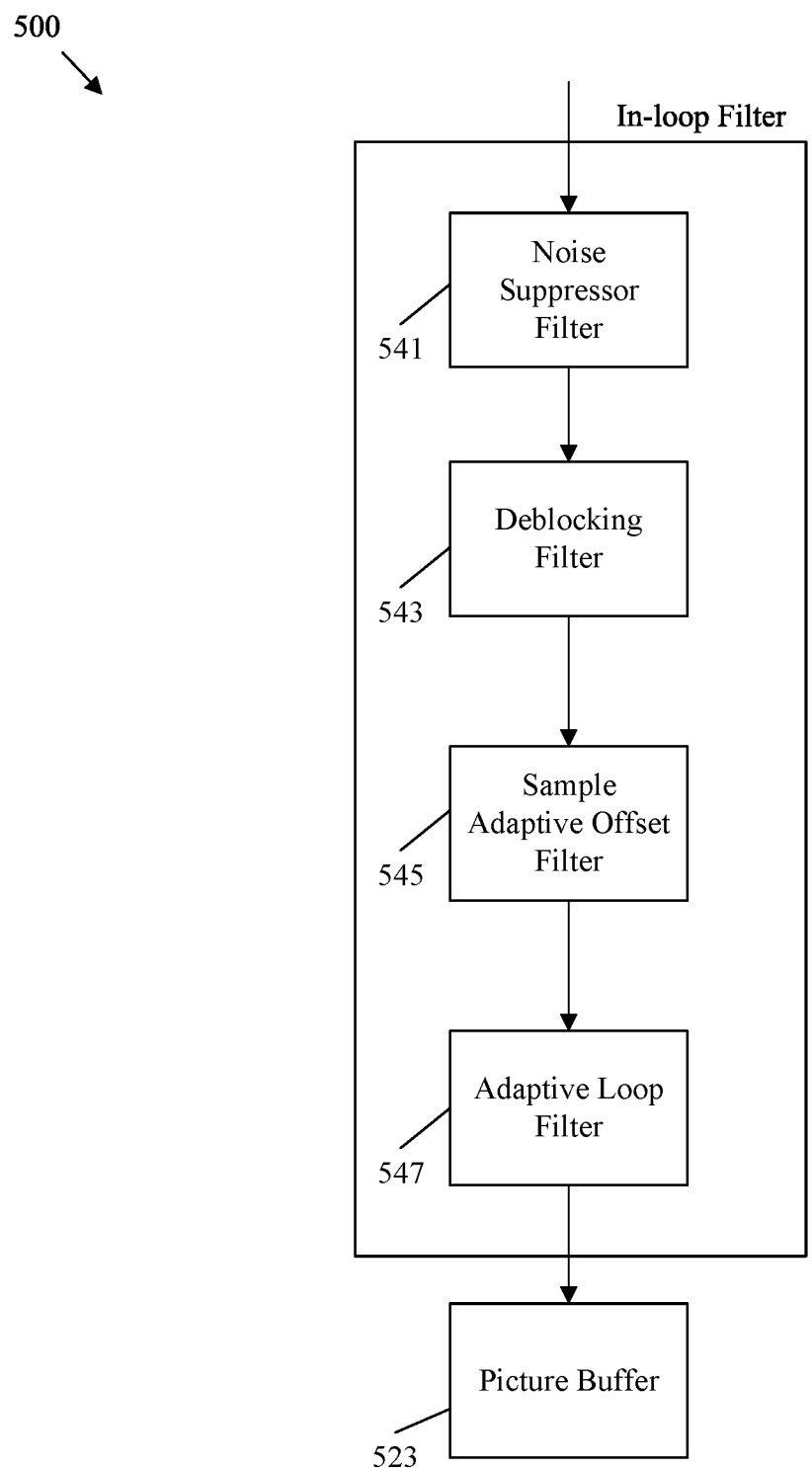
FIG. 5 is a block diagram illustrating an example in-loop filter including a noise suppression filter.

FIG. 5 is a block diagram illustrating an example in-loop filter 500 including a noise suppression filter 541. In-loop filter 500 may be employed to implement in-loop filters 225, 325, and/or 425. The in-loop filter 500 includes a noise suppression filter 541, a deblocking filter 543, a SAO filter 545, and an adaptive loop filter 547. The filters of in-loop filter 500 are applied in sequence to reconstructed image blocks and/or a residual block.

The noise suppression filter 541 is configured to remove quantization noise caused by image compression. Specifically, the noise suppression filter 541 is employed to remove artefacts that occur at edges in the image. For example, image compression may create distinct and incorrect color/light values adjacent to sharp transitions (edges) between different color/light patches in an image. This is referred to as ringing, and is caused by application of transforms to high frequency portions of the image data that are associated with sharp edges. The noise suppression filter 541 is employed to mitigate such ringing artefacts. The noise suppression filter 541 operates in both the spatial domain (e.g., spatial orientation of pixels) and the frequency domain (e.g., relationship of transformed coefficient values relating to pixel data). At the encoder, the noise suppression filter 541 partitions a reconstructed frame into reference macroblocks. Such blocks can also be sub-divided into smaller reference blocks. The noise suppression filter 541 first generates an application map indicating the portions of the frame that should be filtered based on an estimated amount of quantization noise at the block. The noise suppression filter 541 then employs a matching component to determine, for each reference block as indicated by the application map, a set of patches that are similar to the corresponding reference block, where similar indicates chroma/luma values are within a predetermined range. The noise suppression filter 541 then groups the patches into clusters and may employ a two dimensional (2D) transform to transform the clusters into the frequency domain resulting in frequency domain patches. The noise suppression filter 541 may also employ a reverse 2D transform to convert the frequency domain patches back into the spatial domain.

The noise suppression filter 541 employs collaborative filtering, which includes determining collaborative filter parameters that describe common portions of the image frame in the frequency domain and the pixel domain. For example, the collaborative filter parameters may be determined by regrouping elements of the transformed patches to obtain a matrix $T_i$, where each row of the matrix $T_i$ comprises frequency components with the same spatial frequencies. The matrix $T_i$ is transformed to obtain a transformed matrix $\text{tf}_{vw}^i$, where each row of the matrix $\text{tf}_{vw}^i$ is a one dimensional transform of a corresponding row of matrix $T_i$. The filter parameters, denoted as $g_{v,w}^i$, are then determined according to:

$$g_{vw}^i(\Omega) = \frac{(tf_{vw}^i(\Omega))^2}{(tf_{vw}^i(\Omega))^2 + N^2}$$

wherein $\Omega$ is a column number in matrix $\text{tf}_{vw}^i$, spatial frequencies v, w correspond to the j-th row of matrix $\text{tf}_{vw}^i$ and N is a quantization noise value. The determined parameters and the application map are encoded in the bitstream. At the decoder, the application map is employed to determine where to apply the filter and the parameters are employed to set the filter to mitigate ringing noise in the reconstructed image.

The deblocking filter 543 is configured to remove block shaped edges created by the blocked based inter and intra prediction. The deblocking filter 543 scans an image portion (e.g., image slice) for discontinuities in chroma and/or luma values occurring at partition boundaries. The deblocking filter 543 then applies a smoothing function to the block boundaries to remove such discontinuities. The strength of the deblocking filter 543 may be varied depending on the spatial activity (e.g., variance of luma/chroma components) occurring in an area adjacent to the block boundaries.

The SAO filter 545 is configured to remove artefacts related to sample distortion caused by the encoding process. The SAO filter 545 at an encoder classifies deblocked samples of a reconstructed image into several categories based on relative deblocking edge shape and/or direction. An offset is then determined and added to the samples based on the categories. The offsets are then encoded in the bitstream and employed by the SAO filter 545 at the decoder. The SAO filter 545 removes banding artefacts (bands of values instead of smooth transitions) and ringing artefacts (spurious signals near sharp edges).

The adaptive loop filter 547, at the encoder, is configured to compare a reconstructed image to an original image. The adaptive loop filter 547 determines coefficients that describe the differences between the reconstructed image and the original image, for example via a Wiener based adaptive filter. Such coefficients are encoded in the bitstream and employed at the adaptive loop filter 547 at the decoder to remove the differences between the reconstructed image and the original image. While the adaptive loop filter 547 is effective in correcting artefacts, greater differences between the reconstructed image and the original image result in a greater number of coefficients to be signaled. This in turn creates a larger bitstream and hence reduces the effectiveness of compression. As such, minimization of differences by other filters prior to applying the adaptive loop filter 547 results in improved compression.

As noted above, the location of the noise suppression filter 541 relative to the other filers has an effect on the filtering process. In-loop filter 500 receives a reconstructed image from an encoded video stream. In-loop filter 500 then filters the reconstructed image to create a filtered image. The filtering includes applying a noise suppression filter 541 to the reconstructed image immediately prior to applying the deblocking filter 543 to the reconstructed image. This approach allows the noise suppression filter 541 to both suppress quantization noise and perform deblocking functions as a consequence of the noise suppression process. Accordingly, the deblocking filter 543 receives an improved image and performs fewer computations. This may result in improved processing time and/or reduce signaling overhead in the bitstream. The filtered image may then be stored in a decoded picture buffer 523 in memory for either transmission to a decoder (encoder side) or display to an end user (decoder side). The decoded picture buffer 523 may be substantially similar to the decoded picture buffer 223, 323, and/or 423.

Figure 6:
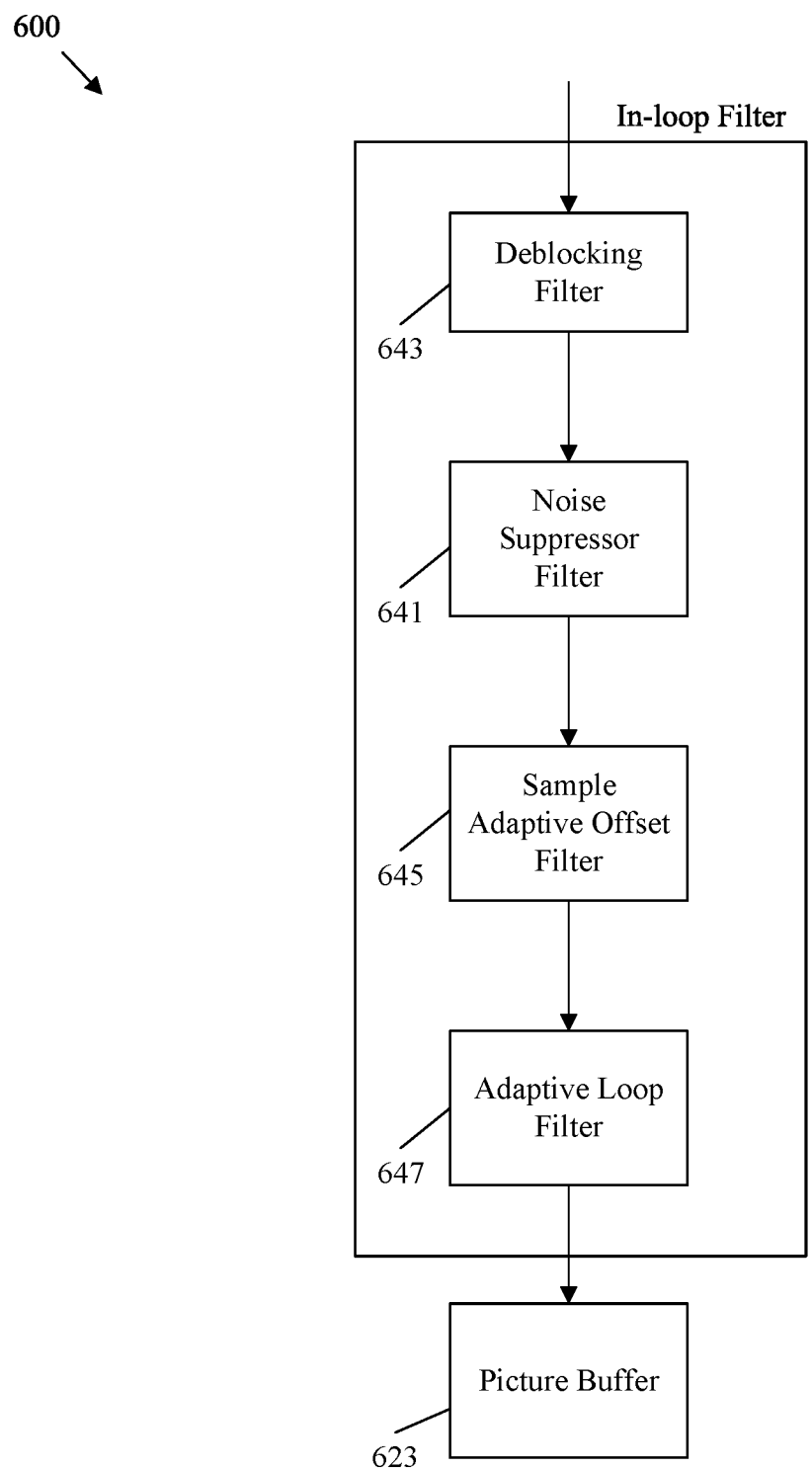
FIG. 6 is a block diagram illustrating another example in-loop filter including a noise suppression filter.

FIG. 6 is a block diagram illustrating another example in-loop filter 600 including a noise suppression filter 641. In-loop filter 600 may be employed to implement in-loop filters 225, 325, and/or 425. The in-loop filter 600 includes a noise suppression filter 641, a deblocking filter 643, a SAO filter 645, and an adaptive loop filter 647, which are substantially similar to the noise suppression filter 541, the deblocking filter 543, the SAO filter 545, and the adaptive loop filter 547, respectively. The filters of in-loop filter 600 are applied in sequence to reconstructed image blocks and/or a residual block.

As shown, in-loop filter 600 receives a reconstructed image from an encoded video stream. In-loop filter 600 then filters the reconstructed image to create a filtered image. The filtering includes applying a noise suppression filter 641 to the reconstructed image immediately after applying a deblocking filter 643 to the reconstructed image and immediately prior to applying a SAO filter 645 to the reconstructed image. This approach applies the deblocking filter 643 first, which may remove some quantization noise during deblocking. As a result, the noise suppression filter 641 may be applied to fewer portions of the reconstructed image. This may result in a smaller application map, and hence reduce corresponding coding size, as well as reduce processing time, at both the encoder and decoder, related to the noise suppression filter 641. The filtered image may then be stored in a decoded picture buffer 623 in memory for either transmission to a decoder (encoder side) or display to an end user (decoder side). The decoded picture buffer 623 may be substantially similar to the decoded picture buffer 223, 323, and/or 423.

Figure 7:
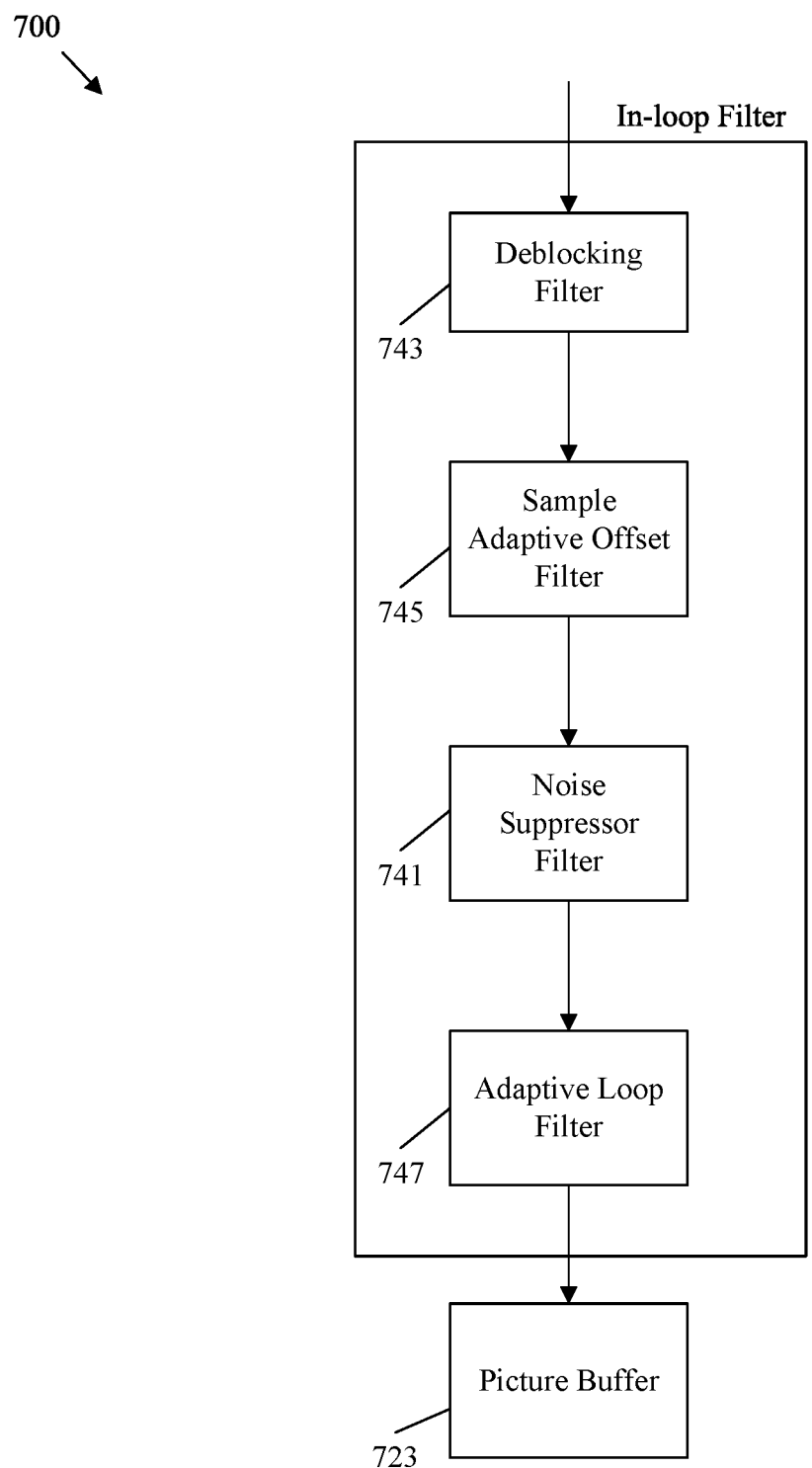
FIG. 7 is a block diagram illustrating another example in-loop filter including a noise suppression filter.

FIG. 7 is a block diagram illustrating another example in-loop filter 700 including a noise suppression filter 741. In-loop filter 700 may be employed to implement in-loop filters 225, 325, and/or 425. The in-loop filter 700 includes a noise suppression filter 741, a deblocking filter 743, a SAO filter 745, and an adaptive loop filter 747, which are substantially similar to the noise suppression filter 541, the deblocking filter 543, the SAO filter 545, and the adaptive loop filter 547, respectively. The filters of in-loop filter 700 are applied in sequence to reconstructed image blocks and/or a residual block.

As shown, in-loop filter 700 receives a reconstructed image from an encoded video stream. In-loop filter 700 then filters the reconstructed image to create a filtered image. The filtering includes applying the noise suppression filter 741 to the reconstructed image immediately after applying a SAO filter 745 to the reconstructed image and immediately prior to applying the adaptive loop filter 747 to the reconstructed image. This positioning allows the deblocking filter 743 and the SAO filter 745 to remove more quantization noise, and hence further reduce the workload on the noise suppression filter 741. Accordingly, this configuration may further reduce application map size and reduce corresponding coding size, as well as reduce processing time, at both the encoder and decoder, related to the noise suppression filter 741. Further, the noise suppression filter 741 is still applied prior to the adaptive loop filter 747, which is generally the most powerful filter. Accordingly, the noise suppression filter 741 still reduces workload on the adaptive loop filter 747, and hence encoding size related to parameters generated by the adaptive loop filter 747. The filtered image may then be stored in a decoded picture buffer 723 in memory for either transmission to a decoder (encoder side) or display to an end user (decoder side). The decoded picture buffer 723 may be substantially similar to the decoded picture buffer 223, 323, and/or 423.

Figure 8:
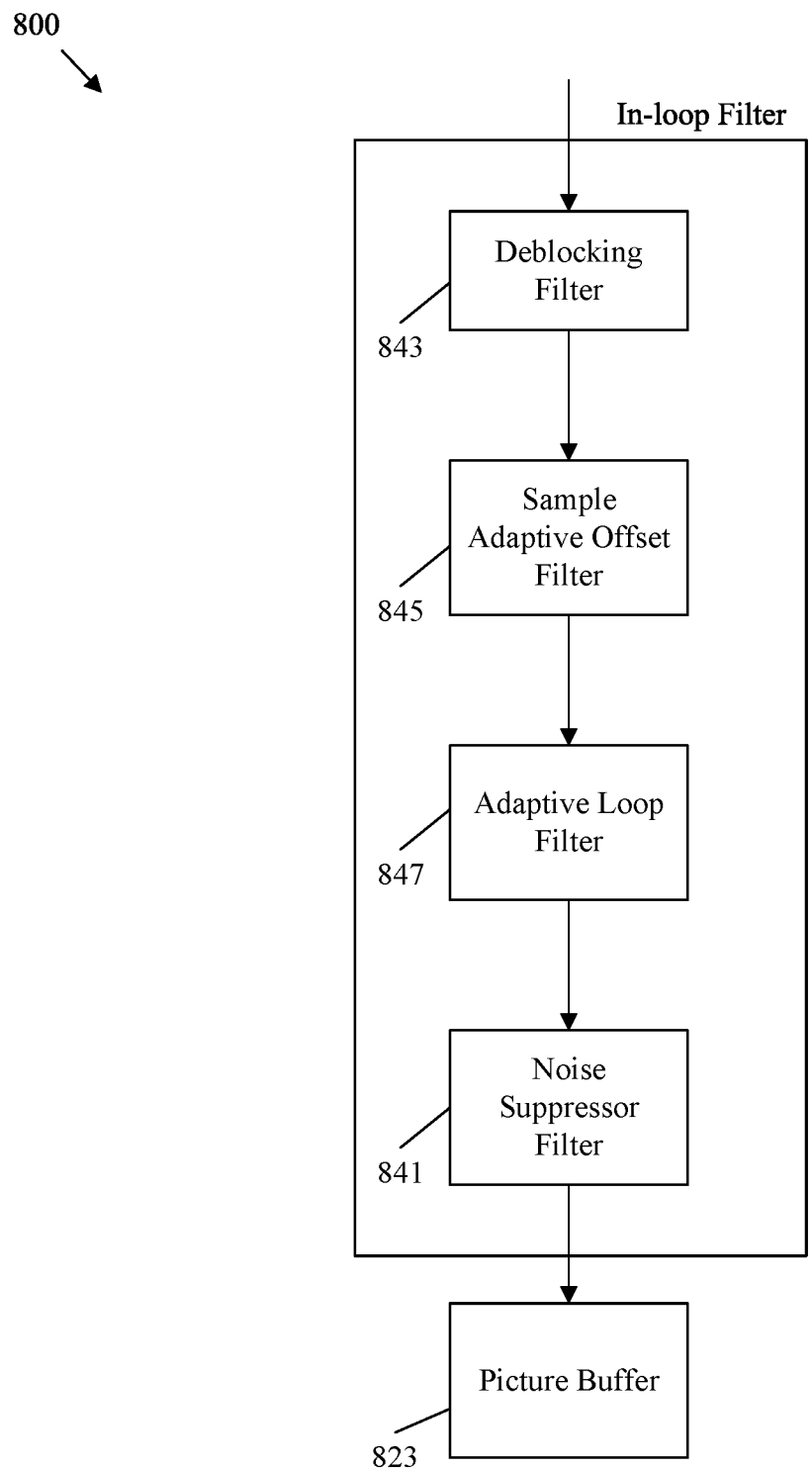
FIG. 8 is a block diagram illustrating another example in-loop filter including a noise suppression filter.

FIG. 8 is a block diagram illustrating another example in-loop filter 800 including a noise suppression filter 841. In-loop filter 800 may be employed to implement in-loop filters 225, 325, and/or 425. The in-loop filter 800 includes a noise suppression filter 841, a deblocking filter 843, a SAO filter 845, and an adaptive loop filter 847, which are substantially similar to the noise suppression filter 541, the deblocking filter 543, the SAO filter 545, and the adaptive loop filter 547, respectively. The filters of in-loop filter 800 are applied in sequence to reconstructed image blocks and/or a residual block.

As shown, in-loop filter 800 receives a reconstructed image from an encoded video stream. In-loop filter 800 then filters the reconstructed image to create a filtered image. The filtering includes applying the noise suppression filter 841 to the reconstructed image immediately after applying an adaptive loop filter 847 to the reconstructed image. The filtered image may then be stored in a decoded picture buffer 823 in memory for either transmission to a decoder (encoder side) or display to an end user (decoder side). The decoded picture buffer 823 may be substantially similar to the decoded picture buffer 223, 323, and/or 423.

As such, the noise suppression filter is employed as in-loop filter in the video compression/decompression process, and can be located in various positions among all in-loop filters which include, but are not limited to, a de-blocking filter, an SAO filter, and an adaptive loop filter (ALF).

Figure 9:
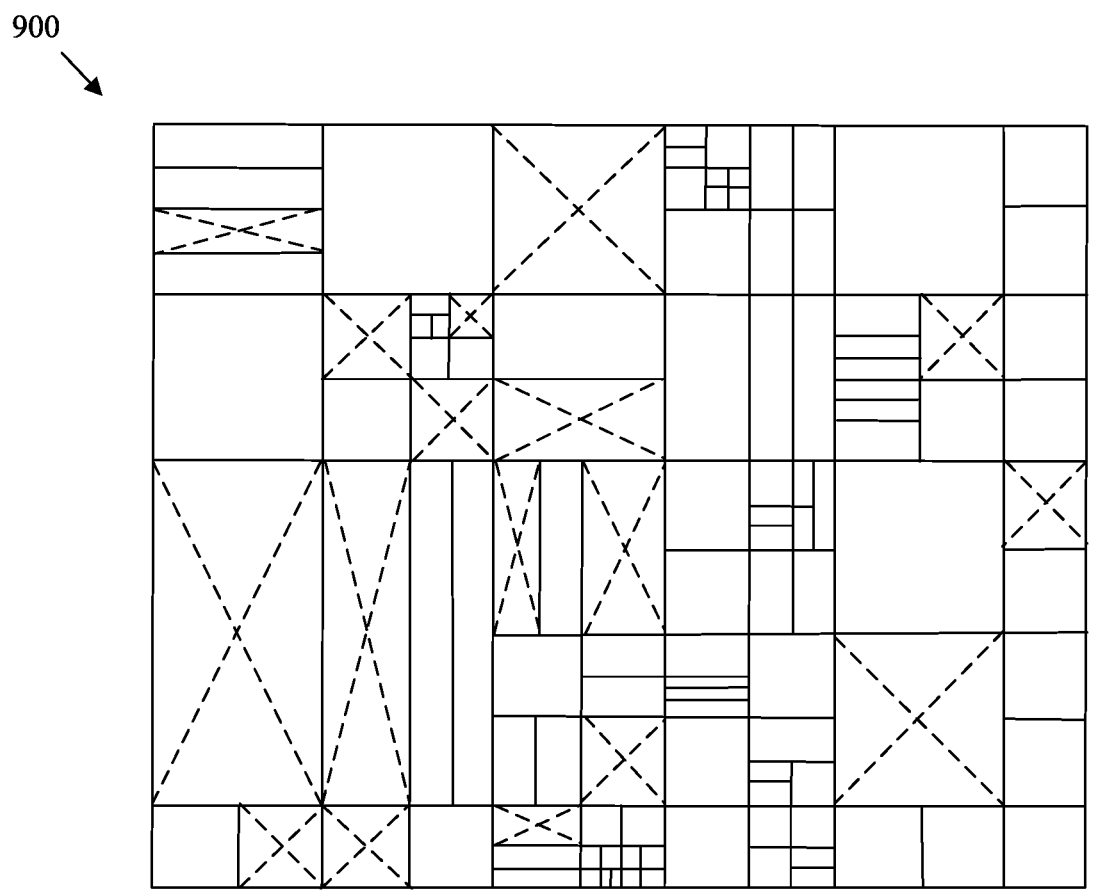
FIG. 9 is a diagram illustrating an example application map for application of a noise suppression filter.

FIG. 9 is a diagram illustrating an example application map 900 for application of a noise suppression filter, such as noise suppression filter 541, 641, 741, and/or 841. As noted above with respect to FIG. 5, a noise suppression filter at an encoder generates an application map, such as application map 900, to indicate to a decoder the portions of an image frame that should be filtered by a corresponding noise suppression filter at a decoder. Such application map is encoded in the bitstream along with associated noise suppression parameters. Application map 900 illustrates such a map for an example image frame. The noise suppression filter can subdivide macroblocks into smaller blocks to support fine detail filtering at the cost of additional complexity and increased coding space usage. The application map 900 has no depth restriction, which indicates the noise suppression filter is allowed to continually subdivide macroblocks as desired to obtain an optimized filtering without regard to complexity. The application map 900 includes empty boxes indicating that the noise suppression filter is not applied to the corresponding blocks. The application map 900 also includes boxes marked with a dashed X. Such boxes indicate that the noise suppression filter is applied to the corresponding blocks.

Figure 10:
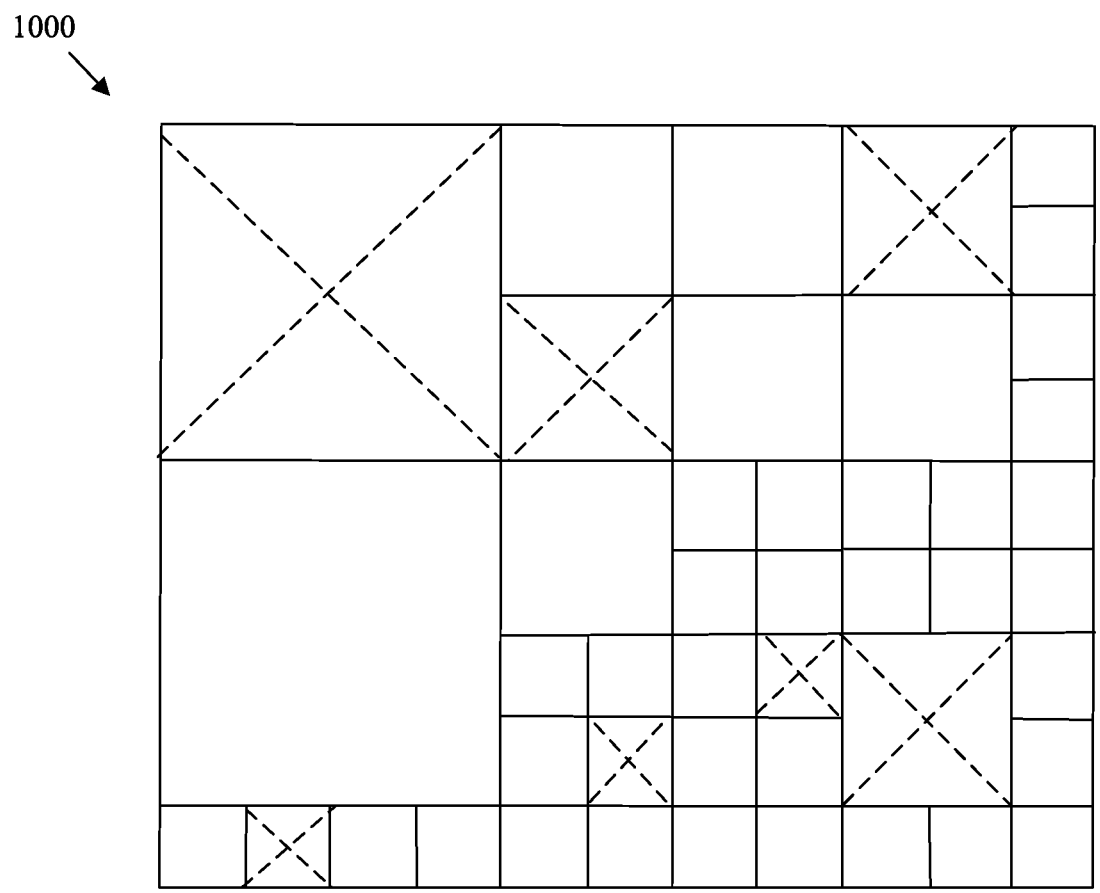
FIG. 10 is a diagram illustrating an example application map with a maximum depth restriction.

FIG. 10 is a diagram illustrating an example application map 1000 for partitioning an image with a maximum depth restriction for use in applying a noise suppression filter, such as noise suppression filter 541, 641, 741, and/or 841. Application map 1000 is similar to application map 900, but includes a maximum depth restriction of two. This maximum depth restriction allows the noise suppression filter to subdivide the macroblocks twice to determine the smallest block for application of the noise suppression filter. The depth restriction reduces filtering precision, but decreases signaling overhead, filter complexity, processing time, and coding space. Accordingly, depth restriction may be altered as desired based on bandwidth availability, memory availability, resolution requirements, etc.

Figure 11:
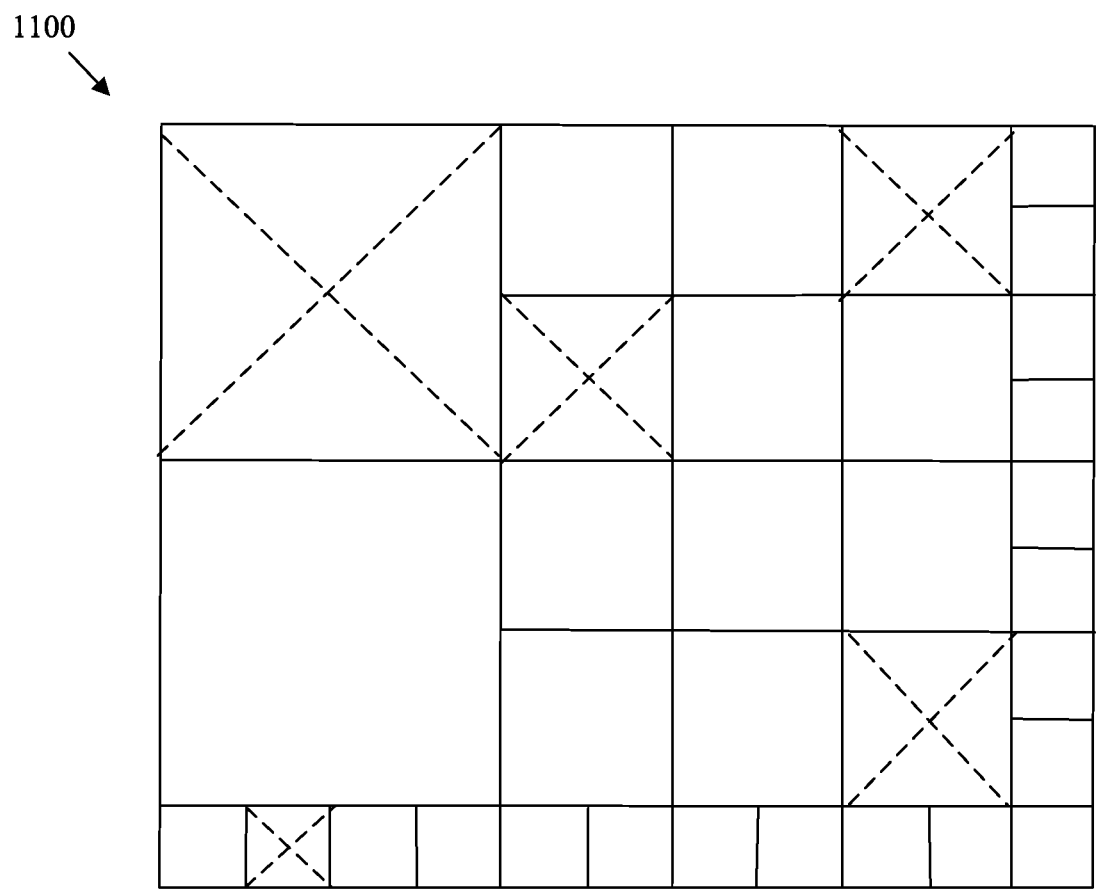
FIG. 11 is a diagram illustrating another example application map with a maximum depth restriction.

FIG. 11 is a diagram illustrating another example application map 1100 for partitioning an image with a maximum depth restriction for use in applying a noise suppression filter, such as noise suppression filter 541, 641, 741, and/or 841. Application map 1100 is similar to application map 900, but includes a maximum depth restriction of one. This maximum depth restriction allows the noise suppression filter to subdivide the macroblocks once to determine the smallest block for application of the noise suppression filter. The depth restriction further reduces filtering precision, but decreases filter complexity, processing time, and coding space. As shown, depth restriction can be set to any desired value to balance video resolution constraints with memory space and processing resource constraints.

As noted above, an application map, such as application map 900, 1000, and/or 1100 is computed by a noise suppression filter, such as noise suppression filter, 541, 641, 741, and/or 841 at the encoder and signaled to a corresponding noise suppression filter at the decoder via the bitstream to specify which regions of the frame are filtered. Various flags can be employed for signaling noise suppression filter data, including application map data. For example sequence parameter set (SPS) control flags, picture parameter set (PPS) control flags, a slice header adaptive flag, a slice header control flag, a slice header maximal depth size flag, and/or a CU control flag can be employed to signal an application map and associated data. Such flags are discussed below.

In some examples, a noise suppression filter can be turned on or off at a sequence level by using a flag (e.g., one bit flag) in an SPS set in the bitstream. Such a flag controls whether the noise suppression filter is applied to an entire sequence of frames. For example, table 1 indicates general sequence parameter set raw byte sequence payload (RBSP) syntax for employing a SPS noise suppression filter enabled flag (sps_ns_filter_enabled_flag) to control noise suppression filter usage at the sequence level.

TABLE 1

| | Descriptor |
|---|---|
| seq_parameter_set_rbsp( ) { | |
| ... | |
| sps_ns_filter_enabled_flag | u(1) |
| ... | |
| } | |

In this example, sps_ns_filter_enabled_flag may be set to one to specify that the noise suppression filter is applied to the reconstructed pictures in the current sequence, and set to zero to specify that the noise suppression filter is not applied to the reconstructed picture/sequence.

In another example, a noise suppression filter can be turned on or off at a picture level by using a flag (e.g., one bit flag) in a PPS set in the bitstream. Such a flag controls whether the noise suppression filter is applied to a particular frame. For example, table 2 indicates RBSP syntax for employing a PPS noise suppression filter enabled flag (pps_ns_filter_enabled_flag) to control noise suppression filter usage at the picture level.

TABLE 2

| | Descriptor |
|---|---|
| pic_parameter_set_rbsp( ) { | |
| ... | |
| pps_ns_filter_enabled_flag | u(1) |
| ... | |
| } | |

In this example, pps_ns_filter_enabled_flag may be set to one to specify that the noise suppression filter is applied to the current picture, and set to zero to specify that the noise suppression filter is not applied to the current picture. When pps_ns_filter_enabled_flag is not present, the flag may be inferred to be set to zero.

In some examples, the usage of the noise suppression filter is signaled independently either in the SPS level or the PPS level, but not in both. For example, if the sps_ns_filter_enabled_flag is available, then pps_ns_filter_enabled_flag is not present, and vice versa. In another example, the usage of the noise suppression filter is signaled at both the SPS level and the PPS level. When such flags conflict, different (e.g., SPS flag indicates filter on/off while PPS flag indicates filter off/on) the PPS flag (enabling or disabling) overrides the SPS flag for the pictures associated the PPS flag.

In another example, a slice header noise suppression filter adaptive flag (slice_ns_filter_adaptive_flag) is employed. A noise suppression filter can be applied to entire slices (e.g., strips of macroblocks) or adaptively applied on a CU by CU basis. The flag to specify filtering type may be signaled in a slice header according to table 3.

TABLE 3

| | Descriptor |
|---|---|
| slice_segment_header( ) { | |
| ... | |
| if (pps_ns_filter_enabled_flag) { | |
| slice_ns_filter_adaptive_flag | u(1) |
| ... | |
| } | |

The slice_ns_filter_adaptive_flag, specified in the bitstream, may be set to zero to specify that the noise suppression filter may be applied on an entire slice basis, and set equal to one to specify that the noise suppression filter is applied adaptively to CUs based on an application map coded in the bitstream. The slice_ns_filter_adaptive_flag may be inferred to be set to zero when not present.

When the slice_ns_filter_adaptive_flag specifies that the noise suppression filter may be applied on an entire slice basis (e.g., not adaptively to CUs), a slice noise suppression control flag (slice_ns_control_flag) may be signaled in a slice header to specify whether the noise suppression filter is applied for the whole slice or not as shown in Table 4.

TABLE 4

| | Descriptor |
|---|---|
| slice_segment_header( ) { | |
| ... | |
| if (!slice_ns_filter_adaptive_flag) { | |
| slice_ns_filter_control_flag | u(1) |
| ... | |
| } | |

The slice_ns_filter_control_flag may be set to zero to specify that the noise suppression filter is not applied for an entire slice, and set to one to specify that the noise suppression filter is applied to an entire slice. The slice_ns_filter_control_flag may be inferred to be set to zero when not present.

When a slice_ns_filter_adaptive_flag indicates that the noise suppression filter is applied adaptively on a CU by CU basis, an application map, such as application map 900, 1000, and/or 1100 is signaled in the bitstream at the CU level. To decrease signaling overhead, a maximal CU depth for application map may be signaled in a slice header as a slice noise suppression filter max CU depth (slice_ns_max_cu_depth) flag as shown in table 5.

TABLE 5

| | Descriptor |
|---|---|
| slice_segment_header( ) { | |
| ... | |
| if (slice_ns_filter_adaptive_flag) { | |
| slice_ns_max_cu_depth | u(n) |
| ... | |
| } | |

The size of the slice_ns_max_cu_depth may vary depending on a number of bits employed to uniquely signal the maximal depth allowed for a corresponding coding tree. The slice_ns_max_cu_depth specifies a maximal depth (e.g., depth restriction) for CU level noise suppression filter application in a corresponding application map. For example, slice_ns_max_cu_depth may be set to zero for application map 900, set to two for application map 1000, or set to one for application map 1100. When slice_ns_max_cu_depth is set to zero, only coding tree unit (CTU) based flags are signaled to specify whether specified CTUs should be filtered by the noise suppression filter or not.

When the slice_ns_filter_adaptive_flag indicates that the noise suppression filter is applied adaptively on a CU by CU basis, the slice_ns_max_cu_depth may be specified in a slice header, and a CU based application map is signaled on the CU level. This may include signaling as part of a quad tree structure shown in table 6.

TABLE 6

| | Descriptor |
|---|---|
| coding_quadtree( x0, y0, log2CbSize, cqtDepth ){ | |
| ... | |
| if(slice_ns_filter_adaptive_flag) { | |
| if (cqtDepth < slice_ns_max_cu_depth) { | |
| cu_ns_filter_enabled_flag | ae(v) |
| ... | |
| } | |

In this example, a CU noise suppression filter enabled flag (cu_ns_filter_enabled_flag) is set to one to specify that the noise suppression filter is enabled for a current coding unit, and set to zero to specify that the noise suppression filter is disabled for the current coding unit. When the cu_ns_filter_enabled_flag is not present at the CU level, the flag value is inherited from the last filter flag signaled at a higher depth (e.g., at the slice level).

The noise suppression filter can also be controlled by deriving values from the slice header. For example, a code word may be employed to control the on/off/adaptive on-off states for blocks of the same size within one slice. Noise suppression filter block size (ns_block_size) flags may also be employed to indicate the size of a block that applies the noise suppression filter. The same block size may be used for noise suppression filtering in each slice. The usage of noise suppression filtering (e.g., on/off) for processing a block can be adaptively determined according to the flags. An application map represents the usage of noise suppression filtering for each block in the slice. The block size can be the same as the coding tree unit/CU size, or may be different. Example block size specification syntax is shown in Table 7.

TABLE 7

|  | Descriptor |
|---|---|
| slice_segment_header( ) { | |
| ... | |
| slice_ns_filter_enabled_flag | ue(v) |
| if (!slice_ns_filter_enabled_flag) { | |
| log2_ns_block_size_minus3 | ue(v) |
| while (!ns_blocks_finish( )) | |
| ns_app_map[i] | ae(v)/ ue(v) |
| } | |
| ... | |
| } | |

In this example, the slice_ns_filter_enabled_flag is set to zero to specify that the noise suppression filter is enabled adaptively for a block in the current slice. The slice_ns_filter_enabled_flag is set to one to specify that the noise suppression filter is enabled in the current slice, and set to two to specify that the noise suppression filter is disabled in the current slice. The slice_ns_filter_enabled_flag may be inferred to be set to zero when not present. The log 2_ns_block_size_minus3 specifies the size of the noise suppression filter block. The ns_app_map specifies the set of flags which are related to each noise suppression filter block in current slice. The ns_app_map[i] is set to zero to specify that i-th noise suppression block in the current slice is off, and set to one to specify that i-th noise suppression block in the current slice is on. The ns_blocks_finish( ) mechanism counts noise suppression blocks and return zero when a current value is less than or equal to a total amount of noise suppression blocks in the current slice.

In another example, the noise suppression filter is always enabled adaptively at the decoder and the encoder. In such a case, the application map and block size are transmitted from the encoder and parsed from the bitstream at the decoder without conditions as shown in table 8.

TABLE 8

|  | Descriptor |
|---|---|
| slice_segment_header( ) { | |
| ... | |
| log2_ns_block_size_minus3 | ue(v) |
| while (!ns_blocks_finish( )) | |
| ns_app_map[i] | ae(v)/ ue(v) |
| ... | |
| } | |

The log 2 ns_block_size_minus3 flag specifies the size of the noise suppression filter block. The ns_app_map flag specifies the set of flags which are related to each noise suppression block in the current slice. The ns_app_map[i] is set to zero to specify that the i-th block in the current slice is off, and set to one to specify that the i-th block in the current slice is on. The ns_blocks_finish( ) mechanism counts noise suppression blocks and returns zero when a current value is less than or equal to a total amount of noise suppression blocks in the current slice.

In another example, the block size can be represented according to a width flag (log 2_ns_width_minus3) and height flag (log 2 ns_height_minus3) indicating the size of the noise suppression blocks as shown in table 9.

TABLE 9

|  | Descriptor |
|---|---|
| slice_segment_header( ) { | |
| ... | |
| slice_ns_filter_enabled_flag | ue(v) |
| if (!slice_ns_filter_enabled_flag) { | |
| log2_ns_width_minus3 | ue(v) |
| log2_ns_height_minus3 | ue(v) |
| while (!ns_blocks_finish( )) | |
| ns_app_map[i] | ae(v)/ ue(v) |
| } | |
| ... | |
| } | |

In this example, the log 2_ns_width_minus3 specifies the width of noise suppression filter block, and the log 2_ns_height_minus3 specifies the height of noise suppression filter block. The ns_app_map flag specifies the set of flags which are related to each noise suppression block in current slice. The ns_app_map[i] is set to zero to specify that i-th suppression block in the current slice is off, and set to one to specify that i-th noise suppression block in the current slice is on. The ns_blocks_finish( ) mechanism counts noise suppression blocks and return zero when a current value is less than or equal to the total amount of noise suppression blocks in the current slice.

In another example, the block size can be represented by ns_max_depth, where ns_max_depth makes use of the block partition (e.g., QT, BT, TT) of the coding tree unit corresponding to the noise suppression block. For example, when the block partition is QT, ns_max_depth is set to zero to specify that the size of noise suppression block is two 2 ns_max_depth in the current slice, and set to one to specify that the size of the noise suppression block is 2 ns_max_depth−1 in the current slice.

The application map, such as application maps 900, 1000, and/or 1100 may be context coded. The contexts may be derived from neighboring coding tree units or blocks. In one example, the corresponding flag is entropy coded with one context, and the context is derived from the immediately preceding neighboring coding tree unit, or block, in coding order. In another example, the corresponding flag is entropy coded with N (N>1) contexts, and these contexts are derived from the current coding tree unit/block's immediate N previous neighboring coding tree units or blocks in coding order. In yet another example, the flag may be entropy coded with three contexts, which are associated with three conditions: (1) left neighbor and top neighbor both have the filter enabled; (2) left neighbor and top neighbor both have the filter disabled; and (3) one of the left and top neighbors have the filter enabled. The binarization for a slice_ns_filter_enabled_flag can be a fixed length codeword or variable length code word, as shown in Table 10.

TABLE 10

| The value of slice_ns_filter_enabled_flag | Bin string |
|---|---|
| 0 | 00 |
| 1 | 01 |
| 2 | 10 |

An example binarization for slice_ns_filter_enabled_flag using unary truncated code is shown in table 11.

TABLE 11

| The value of slice_ns_filter_enabled_flag | Bin string |
|---|---|
| 0 | 0 |
| 1 | 10 |
| 2 | 11 |

The meaning of the flags disclosed herein, such as slice_ns_filter_enabled_flag, can employ different binary values. For example, zero may specify that the noise suppression filter is applied for a whole slice/frame, one may specify that the noise suppression filter process is adaptively applied for a partial portion of the slice/frame or the whole slice/frame, and two may specify that the noise suppression filter is not applied for whole slice/frame.

The noise suppression blocks in a coding tree unit can also be obtained by employing a block partition tree (e.g., QT, BT, TT) of the coding tree unit, noise suppression partition tree of the coding tree unit, etc. The noise suppression partition of the coding tree unit may be different than the block partition tree of the coding tree unit. The minimum block size resultant by the partition tree depends on partitioned depth. A slice_max_ns_cu_depth may be signaled in a slice header and to specify the maximal coding unit depth where a noise suppression filter flag is signaled. Values of noise suppression filter flag for CUs with depths less than slice_max_ns_cu_depth are grouped into a block with a depth of slice_max_ns_cu_depth and share the same flags. One of the possible implementations is presented in tables 12-14.

TABLE 12

| | Descriptor |
|---|---|
| slice_segment_header( ) { | |
| ... | |
| slice_ns_filter_enabled_flag | ue(v) |
| if (!slice_ns_filter_enabled_flag) { | |
| slice_max_ns_cu_depth | ue(v) |
| ... | |
| } | |

TABLE 13

| | Descriptor |
|---|---|
| coding_quadtree( x0, y0, log2CbSize, cqtDepth ) { | |
| ... | |
| if( split_cu_flag[ x0 ][ y0 ] ) { | |
| If (cqtDepth == slice_max_ns_cu_depth) | ae(v) |
| cu_ns_filter_enabled_flag | |
| ... | |
| } | |
| Else | |

TABLE 13-continued

| | Descriptor |
|---|---|
| coding_unit( x0, y0, log2CbSize, cqtDepth ) | |
| ... | |
| } | |

TABLE 14

| | Descriptor |
|---|---|
| coding_unit( x0, y0, log2CbSize, cqtDepth ) { | |
| ... | |
| If (cqtDepth <= slice_max_ns_cu_depth ) | |
| cu_ns_filter_enabled_flag | ae(v) |
| ... | |
| } | |

In this example, slice_ns_filter_enabled_flag is set to zero to specify that the noise suppressor filter is adaptively enabled for filter blocks in current slice, and set to one to specify that the noise suppression filter is enabled in the current slice. slice_ns_filter_enabled_flag is set to two to specify that the noise suppression filter is disabled in the current slice. The slice_ns_filter_enabled_flag may be inferred to be zero when not present. The slice_ns_max_cu_depth specifies the maximum hierarchy depth for coding blocks applied by the noise suppression filter. The value of slice_ns_max_cu_depth may be in the range of zero to Ctb Log 2SizeY. For example, when slice_ns_max_cu_depth is set to zero, only coding tree unit based flags are signaled to specify whether corresponding coding tree units should be filtered by the noise suppression filter. The slice_ns_max_cu_depth may be inferred to zero when not present. The slice_ns_max_cu_depth can employ the block partition (e.g., QT, BT, TT) of the coding tree unit. For example, when the coding tree unit is partitioned by QT, slice_ns_max_cu_depth is set to zero to specify that the size of the noise suppression block is 2Ctb Log 2SizeY in the current slice, set to one to specify a size of 2Ctb Log 2SizeY−1 in the current slice, set to two to specify a size of 2Ctb Log 2SizeY−2, and set to three to specify a size of 2Ctb Log 2SizeY−3. The cu_ns_filter_enabled_flag is set to one to specify that the noise suppression filter is enabled for current coding unit, and zero to specify that the noise suppression filter is disabled for the current coding unit.

In another example, the noise suppression filter is adaptively enabled at the CU level with a size constraint. In this example, the noise suppression filter at the CU level is allowed until a size reaches a threshold. The threshold may be a minimum allowed number of pixels of the CU, a minimum allowed CU size, a minimum allowed number of pixels for width, a minimum allowed number of pixels for height, a minimum allowed number of pixels for minimum (width, height), a minimum allowed number of pixels for maximum (width, height), and/or a minimum allowed ratio between width and height. Tables 15 and 16 include example slice header control flags and coding syntax, respectively.

TABLE 15

| | Descriptor |
|---|---|
| slice_segment_header( ) { | |
| ... | |
| slice_ns_filter_enabled_flag | ue(v) |
| ... | |
| } | |

TABLE 16

| | Descriptor |
|---|---|
| coding_unit( x0, y0, log2CbWidth, log2CbHeight) { | |
| ... | |
| If(log2CbWidth < TH1 \|\| log2CbHeight < TH2 \|\| min(log2Cb Width, log2CbHeight) < TH3 \|\| max(log2CbWidth, log2CbHeight) < TH4 \|\| log2CbWidth*log2CbHeight < TH5 \|\| CbWidth/log2CbHeight < TH6 ) { | |
|     cu_ns_filter_enabled_flag | u(1) |
| if(cu_ns_filter_enabled_flag) | |
|   ns_filter(...) | |
| } | |
| ... | |
| } | |

In this example, the slice_ns_filter_enabled_flag is set to zero to specify that the noise suppression filter is enabled adaptively in the current slice, set to one to specify that the noise suppression filter is enabled in the current slice, and set to two to specify that the noise suppression filter is disabled in the current slice. The slice_ns_filter_enabled_flag can be inferred to be equal to zero when not present. The cu_ns_filter_enabled_flag is set to one to specify noise suppression filter is enabled for a current coding unit, and zero to specify that the noise suppression filter is disabled for the current coding unit. The cu_ns_filter_enabled_flag can be inferred to be equal to zero when not present.

In another example, the noise suppression filter can be controlled at the slice, block, and/or coding tree unit level by using two one bit flags to indicate the usage for luma and chroma. For example when the sps_ns_filter_enabled_flag is available in the bitstream, the slice segment header syntax for chroma/luma signaling is shown in Table 17.

TABLE 17

| | Descriptor |
|---|---|
| slice_segment_header( ) { | |
| ... | |
| if(sps_ns_filter_enabled_flag) { | |
| | u(1) |
| slice_ns_filter_chroma_enabled_flag | u(1) |
| ... | |
| } slice_ns_filter_luma_enabled_flag | |

Where the slice_ns_filter_luma_enabled_flag is set to indicate noise suppression filtering for luma components in a slice and the slice_ns_filter_chroma_enabled_flag is set to indicate noise suppression filtering for chroma components in a slice, respectively.

When the pps_ns_filter_enabled_flag is available in the bitstream, the slice segment header syntax for chroma/luma signaling is shown in Table 18.

TABLE 18

| | Descriptor |
|---|---|
| slice_segment_header( ) { | |
| ... | |
| if(pps_ns_filter_enabled_flag) { | |
| slice_ns_filter_luma_enabled_flag | u(1) |
| slice_ns_filter_chroma_enabled_flag | u(1) |
| ... | |
| } | |

The slice_ns_filter_luma_enabled_flag is set to one to specify that the noise suppression filter process is enabled for the luma component in the current slice, and zero to specify that the noise suppression filter is disabled for the luma components in the current slice. The slice_ns_filter_luma_enabled_flag may be inferred to be zero when not present. The slice_ns_filter_chroma_enabled_flag is set to one to specify that the noise suppression filter is enabled for the chroma components in the current slice, and set to zero to specify that the noise suppression filter process is disabled for the chroma components in the current slice. The slice_ns_filter_chroma_enabled_flag can be inferred to be zero when not present. Similar flags, such as block_ns_filter_chroma_enabled_flag and block_ns_filter_luma_enabled_flag can be employed for signaling chroma and luma, respectively, for blocks. Similar flags, such as ctu_ns_filter_chroma_enabled_flag and ctu_ns_filter_luma_enabled_flag can be employed for signaling chroma and luma, respectively, for coding tree units.

In yet another example, the noise suppression filter can be controlled by deriving flags from neighboring blocks. This example may employ one flag to control all components or individual flags to control each component, respectively. One such example is shown in Table 19.

| | Descriptor |
|---|---|
| ns_filter ( rx, ry ){ | |
| ... | |

TABLE 19

| | |
|---|---|
| ns_filter_merge_left_flag | ae(v) |
| if(! ns_filter _merge_left_flag ) { | |
| ... | |
| ns_filter_merge_up_flag | ae(v) |
| ... | |
| if( ! ns_filter _merge_left_flag && ! ns_filter _merge_up_flag ) | |
| {... | |
| for( cIdx = 0; cIdx < ( ChromaArrayType != 0 ? 3 : 1 ); cIdx++ ) | |
| ns_filter_block_flag | ae(v) |
| ... | |
| } | |

In this example, the ns_filter_merge_left_flag is set to one to specify that the syntax elements for the ns_filter_block_flags are derived from the corresponding syntax elements of the coding tree block to the left from the current coding tree block, and set to zero to specify that these syntax elements are not derived from the corresponding syntax elements of the left coding tree block. The ns_filter_merge_left_flag can be inferred to be zero when not present. The ns_filter_merge_up_flag is set to one to specify that the syntax elements the ns_filter_block_flags are derived from the corresponding syntax elements of the coding tree block above the current coding tree block, and set to zero to specify that these syntax elements are not derived from the corresponding syntax elements of the above coding tree block. The ns_filter_merge_up_flag can be inferred to be zero when not present.

A block_ns_filter_enabled_flag may also be set to one to specify that the noise suppression filter is enabled in a current block, and set to zero to specify that the noise suppression filter is disabled in the current block. The block_ns_filter_enabled_flag can be inferred to be zero when not present.

As such, the noise suppression filter process can be controlled at various sequence/image levels in the compression and decompression process, and the noise suppression filter on the CU level can be controlled based on a depth constraint or size constraint.

Figure 12:
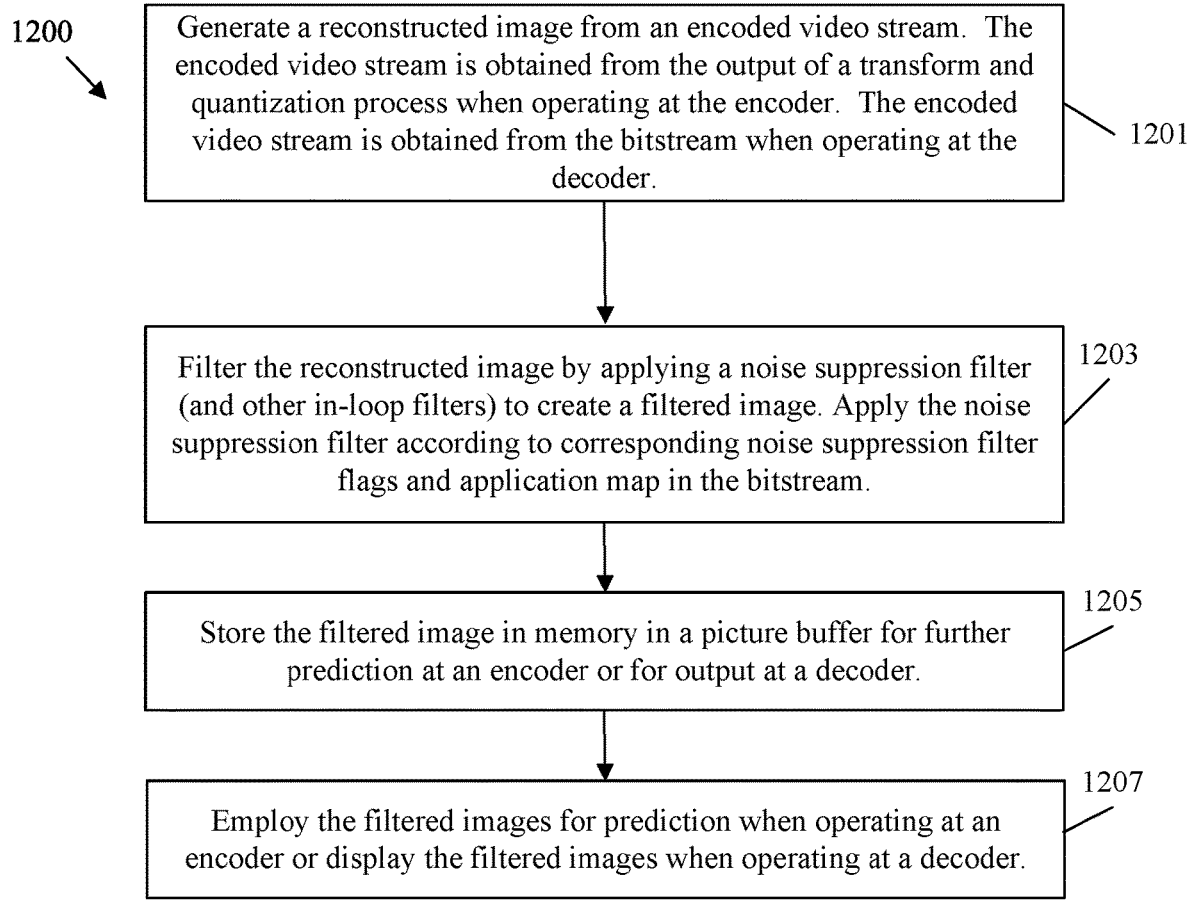
FIG. 12 is a flowchart illustrating an example coding method for applying a noise suppression filter.

FIG. 12 is a flowchart illustrating an example coding method 1200 for applying a noise suppression filter, such as noise suppression filter 541, 641, 741, and/or 841. Method 1200 may be initiated as part of step 107 and/or 115 of method 100. Further method 1200 applies in-loop filters, such as in-loop filters 225, 325, and/or 425. Also, method 1200 employs application maps, such as application map 900, 1000, and/or 1100.

Method 1200 is initiated at an encoder when a frame from an input video stream is encoded, and then designated as a reference frame for inter-prediction. In such a case, an encoded video stream is received as an output from a transform and quantization process. Method 1200 can also be initiated at a decoder when a residual block and a prediction block are obtained from a bitstream. In such a case, the encoded video stream is received from the bitstream. In either case, a reconstructed image is generated from the encoded video stream at step 1201. The reconstructed image may be generated by combining one or more prediction blocks with one or more corresponding residual blocks. The reconstructed image may contain artefacts, such as banding artefacts and/or ringing artefacts caused by quantization noise related to the lossy nature of video compression.

At step 1203, the reconstructed image is filtered to create a filtered image. The filtering includes applying a noise suppression filter and other in-loop filters, such as a deblocking filter, a SAO filter, and/or an adaptive loop filter, to the reconstructed image. In a first example, the filtering includes applying the noise suppression filter to the reconstructed image immediately prior to applying a deblocking filter to the reconstructed image as shown by in-loop filter 500. In a second example, the filtering includes applying the noise suppression filter to the reconstructed image immediately after applying a deblocking filter to the reconstructed image and immediately prior to applying a sample adaptive offset filter to the reconstructed image as shown by in-loop filter 600. In a third example, the filtering includes applying the noise suppression filter to the reconstructed image immediately after applying a sample adaptive offset filter to the reconstructed image and immediately prior to applying an adaptive loop filter to the reconstructed image as shown by in-loop filter 700. In a fourth example, the filtering includes applying the noise suppression filter to the reconstructed image immediately after applying an adaptive loop filter to the reconstructed image as shown by in-loop filter 800.

The noise suppression filter of step 1203 is applied to the reconstructed image according to corresponding noise suppression filter flags and application map in the bitstream as discussed with respect to FIGS. 9-11 and tables 1-17 above. In some examples, the encoded video stream is encoded in a bitstream including a noise suppression filter flag that indicates the noise suppression filter is applied to a sequence of encoded video stream images containing the reconstructed image (e.g., table 1). In some examples, the encoded video stream is encoded in a bitstream including a noise suppression filter flag that indicates the noise suppression filter is applied to the reconstructed image (e.g., table 2). In some examples, the encoded video stream is encoded in a bitstream including a noise suppression filter flag that indicates the noise suppression filter is applied to a slice of the reconstructed image (e.g., table 3). In some examples, the encoded video stream is encoded in a bitstream including a noise suppression filter flag that indicates the noise suppression filter is applied to a coding tree unit of the reconstructed image (e.g., table 5). In some examples, the encoded video stream is encoded in a bitstream including one or more noise suppression filter flags that indicate the noise suppression filter is applied to luma components of the reconstructed image or chroma components of the reconstructed image (e.g., tables 15-16). In another examples, the encoded video stream is encoded in a bitstream including a noise suppression filter flag that indicates the noise suppression filter is applied to a current block of the reconstructed image based on syntax elements corresponding to a neighboring block of the reconstructed image (e.g., table 17). In another example, the encoded video stream is encoded in a bitstream including a maximal depth flag that indicates a maximum depth of coding units in a coding tree to which the noise suppression filter is applied for a sub-portion of the reconstructed image (e.g., tables 5-6). In another example, the encoded video stream is encoded in a bitstream including a size constraint that indicates a minimum size of coding units in a coding tree to which the noise suppression filter is applied for a sub-portion of the reconstructed image (e.g., table 9). In another example, the noise suppression filter is applied to one or more blocks of the reconstructed image based on an application map of the reconstructed image, such as application maps 900, 1000, and/or 1100.

At step 1205, the filtered image is stored in a picture buffer in memory, such as decoded picture buffer 223, 323, and/or 423. The filtered image is then available for use as a reference frame/image when method 1200 operates at an encoder of for display to an end user when 1200 operates at a decoder.

At step 1207, the filtered images are employed as reference frames for inter-prediction when method 1200 is applied at an encoder. In another example, the filtered images in the picture buffer are arranged into sequences and displayed to a user on a display when method 1200 is employed at a decoder.

Figure 13:
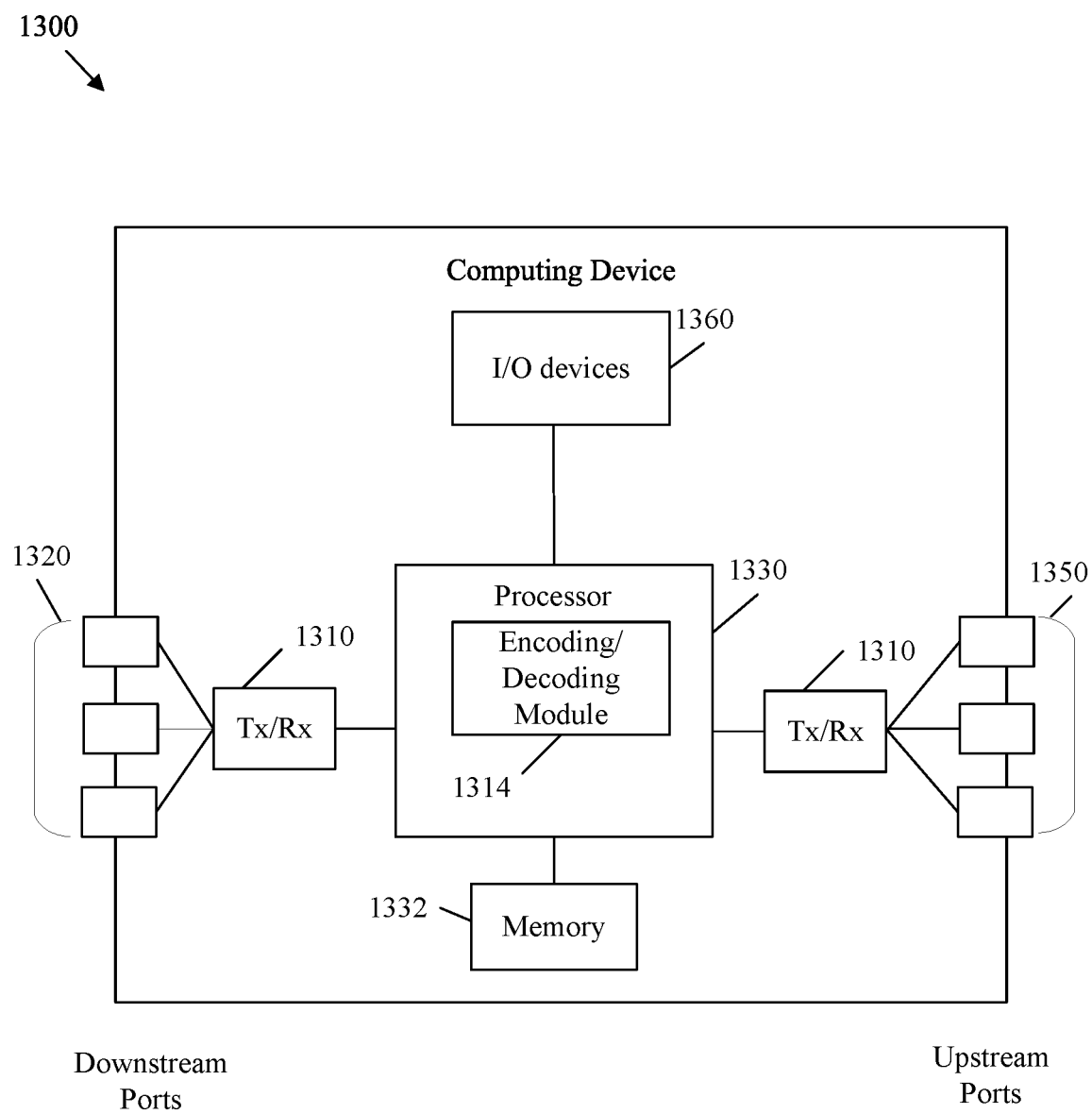
FIG. 13 is a schematic diagram of a computing device for video coding.

FIG. 13 is a schematic diagram of a computing device 1300 for video coding according to an embodiment of the disclosure. The computing device 1300 is suitable for implementing the disclosed embodiments as described herein. The computing device 1300 comprises downstream ports 1320, upstream ports 1350, and/or transceiver units (Tx/Rx) 1310 for communicating data upstream and/or downstream over a network. The computing device 1300 also includes a processor 1330 including a logic unit and/or central processing unit (CPU) to process the data and a memory 1332 for storing the data. The computing device 1300 may also comprise optical-to-electrical (OE) components, electrical-to-optical (EO) components, and/or wireless communication components coupled to the upstream ports 1350 and/or downstream ports 1320 for communication of data via optical or wireless communication networks. The computing device 1300 may also include input and/or output (I/O) devices 1360 for communicating data to and from a user. The I/O devices 1360 may include output devices such as a display for displaying video data, speakers for outputting audio data, etc. The I/O devices 1360 may also include input devices, such as a keyboard, mouse, trackball, etc. and/or corresponding interfaces for interacting with such output devices.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the downstream ports 1320, Tx/Rx units 1310, upstream ports 1350, and memory 1332. The processor 1330 comprises an encoding/decoding module 1314. The encoding/decoding module 1314 implements the disclosed embodiments described above, such as methods 100, 1200, and/or any other mechanisms for performing in-loop filtering as discussed above. Further, the encoding/decoding module 1314 may implement a codec system 200, an encoder 300, decoder 400, and/or in-loop filters 500-800. For instance, the encoding/decoding module 1314 selects the order of application of in-loop filters, determines/employs parameters related to noise suppression filtering to balance coding complexity, coding memory usage, and/or video quality, and/or signals application maps, such as application maps 900, 1000, and/or 1100, as well as other noise suppression filter flags as discussed above. The inclusion of the encoding/decoding module 1314 therefore provides a substantial improvement to the functionality of the computing device 1300 and effects a transformation of the computing device 1300 to a different state. Alternatively, the encoding/decoding module 1314 can be implemented as instructions stored in the memory 1332 and executed by the processor 1330 (e.g., as a computer program product stored on a non-transitory medium).

The memory 1332 comprises one or more memory types such as disks, tape drives, solid-state drives, read only memory (ROM), random access memory (RAM), flash memory, ternary content-addressable memory (TCAM), static random-access memory (SRAM), etc. The memory 1332 may be used as an over-flow data storage device, to store programs when such programs are selected for execution, and to store instructions and data that are read during program execution.

A method, implemented in a computing device, the method comprising a means for generating a reconstructed image from an encoded video stream, a means for filtering the reconstructed image to create a filtered image, the filtering including applying a noise suppression filter to the reconstructed image immediately prior to applying a deblocking filter to the reconstructed image, and a means for storing the filtered image in a picture buffer in memory.

A method, implemented in a computing device, the method comprising a means for generating a reconstructed image from an encoded video stream, a means for filtering the reconstructed image to create a filtered image, the filtering including applying a noise suppression filter to the reconstructed image immediately after applying a deblocking filter to the reconstructed image and immediately prior to applying a sample adaptive offset filter to the reconstructed image, and a means for storing the filtered image in a picture buffer in memory.

A method, implemented in a computing device, the method comprising a means for generating a reconstructed image from an encoded video stream, a means for filtering the reconstructed image to create a filtered image, the filtering including applying a noise suppression filter to the reconstructed image immediately after applying a sample adaptive offset filter to the reconstructed image and immediately prior to applying an adaptive loop filter to the reconstructed image, and a means for storing the filtered image in a picture buffer in memory.

A method, implemented in a computing device, the method comprising a means for generating a reconstructed image from an encoded video stream, a means for filtering the reconstructed image to create a filtered image, the filtering including applying a noise suppression filter to the reconstructed image immediately after applying an adaptive loop filter to the reconstructed image, and a means for storing the filtered image in a picture buffer in memory.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method, implemented in a computing device, the method comprising:
   generating, by a processor of the computing device, a reconstructed image from an encoded video stream;
   filtering, by the processor, the reconstructed image to create a filtered image, the filtering including applying a noise suppression filter to the reconstructed image immediately after applying a sample adaptive offset filter to the reconstructed image and immediately prior to applying an adaptive loop filter to the reconstructed image, wherein the noise suppression filter operates in both a spatial domain and a frequency domain to mitigate ringing artefacts, and wherein applying the noise suppression filter comprises:
   generating an application map indicating portions of the reconstructed image to filter based on estimated amounts of quantization noise at blocks of the reconstructed image;
   matching to determine, for each block indicated by the application map, a set of patches with chroma or luma values within a predetermined range to corresponding reference block;
   grouping the patches into clusters;
   employing a two dimensional (2D) transform to transform the clusters into a frequency domain resulting in frequency domain patches;
   filtering the frequency domain patches; and
   employing a reverse 2D transform to convert the frequency domain patches back into a spatial domain; and
   storing the filtered image in a picture buffer in memory.

2. The method of claim 1, wherein the encoded video stream is encoded in a bitstream including one or more noise suppression filter flags that indicate the noise suppression filter is applied to the reconstructed image.

3. The method of claim 1, wherein the encoded video stream is encoded in a bitstream including one or more noise suppression filter flags that indicate the noise suppression filter is applied to a current block of the reconstructed image based on syntax elements corresponding to a neighboring block of the reconstructed image.

4. The method of claim 1, wherein the encoded video stream is encoded in a bitstream including one or more noise suppression filter flags that indicate the noise suppression filter is applied to a slice of the reconstructed image.

5. The method of claim 1, wherein the encoded video stream is encoded in a bitstream including one or more noise suppression filter flags that indicate the noise suppression filter is applied to a coding tree unit of the reconstructed image.

6. The method of claim 1, wherein the encoded video stream is encoded in a bitstream including one or more noise suppression filter flags that indicate the noise suppression filter is applied to luma or chroma components of the reconstructed image.

7. The method of claim 1, wherein the encoded video stream is encoded in a bitstream including a maximal depth flag that indicates a maximum depth of coding units in a coding tree to which the noise suppression filter is applied for a sub-portion of the reconstructed image.

8. The method of claim 1, wherein the encoded video stream is encoded in a bitstream including one or more noise suppression filter flags that indicate a size constraint that indicates a minimum size of coding units in a coding tree to which the noise suppression filter is applied for a sub-portion of the reconstructed image.

9. The method of claim 1, wherein the encoded video stream is encoded in a bitstream including one or more noise suppression filter flags that indicate the noise suppression filter is applied to one or more blocks of the reconstructed image based on an application map of the reconstructed image.

10. The method of claim 1, wherein filtering the frequency domain patches comprises applying collaborative filtering by determining collaborative filter parameters that describe common portions of the reconstructed image in the frequency domain and the spatial domain.

11. The method of claim 1, wherein the noise suppression filter comprises filter parameters determined according to:

$$g^i_{vw}(\Omega) = \frac{(tf^i_{vw}(\Omega))^2}{(tf^i_{vw}(\Omega))^2 + N^2},$$

wherein $\Omega$ is a column number in matrix $tf_{vw}{}^i$ corresponding to the reconstructed image, spatial frequencies v, w correspond to a j-th row of matrix $tf_{vw}{}^i$, and N is a quantization noise value.

12. An apparatus comprising:
a processor configured to:
generate a reconstructed image from an encoded video stream; and
filter the reconstructed image to create a filtered image, the filtering including applying a noise suppression filter to the reconstructed image immediately after applying a sample adaptive offset filter to the reconstructed image and immediately prior to applying an adaptive loop filter to the reconstructed image, wherein the noise suppression filter operates in both a spatial domain and a frequency domain to mitigate ringing artefacts, and wherein applying the noise suppression filter comprises:
generating an application map indicating portions of the reconstructed image to filter based on estimated amounts of quantization noise at blocks of the reconstructed image;
matching to determine, for each block indicated by the application map, a set of patches with chroma or luma values within a predetermined range to corresponding reference block;
grouping the patches into clusters;
employing a two dimensional (2D) transform to transform the clusters into a frequency domain resulting in frequency domain patches;
filtering the frequency domain patches; and
employing a reverse 2D transform to convert the frequency domain patches back into a spatial domain; and
a memory coupled to the processor, the memory configured to store the filtered image in a picture buffer.

13. The apparatus of claim 12, wherein the encoded video stream is encoded in a bitstream including one or more noise suppression filter flags that indicate: the noise suppression filter is applied to the reconstructed image, a slice of the reconstructed image, a coding tree unit of the reconstructed image, chroma components of the reconstructed image, luma components of the reconstructed image, or combinations thereof.

14. The apparatus of claim 12, wherein the encoded video stream is encoded in a bitstream including one or more noise suppression filter flags that indicate: the noise suppression filter is applied to a current block of the reconstructed image based on syntax elements corresponding to a neighboring block of the reconstructed image, a maximum depth of coding units in a coding tree to which the noise suppression filter is applied for a sub-portion of the reconstructed image, the noise suppression filter is applied to one or more blocks of the reconstructed image based on an application map of the reconstructed image, or combinations thereof.

15. The apparatus of claim 12, wherein filtering the frequency domain patches comprises applying collaborative filtering by determining collaborative filter parameters that describe common portions of the reconstructed image in the frequency domain and the spatial domain.

16. The apparatus of claim 12, wherein the noise suppression filter comprises filter parameters determined according to:

$$g^i_{vw}(\Omega) = \frac{(tf^i_{vw}(\Omega))^2}{(tf^i_{vw}(\Omega))^2 + N^2},$$

wherein $\Omega$ is a column number in matrix $tf_{vw}{}^i$ corresponding to the reconstructed image, spatial frequencies v, w correspond to a j-th row of matrix $tf_{vw}{}^i$, and N is a quantization noise value.

17. The apparatus of claim 12, wherein the encoded video stream is encoded in a bitstream including one or more noise suppression filter flags that indicate a size constraint that indicates a minimum size of coding units in a coding tree to which the noise suppression filter is applied for a sub-portion of the reconstructed image.

* * * * *